United States Patent
Alaerts et al.

(10) Patent No.: US 11,225,393 B2
(45) Date of Patent: Jan. 18, 2022

(54) SPOOL WITH MULTI-POSITION LOOP KEEPER

(71) Applicant: COMMSCOPE CONNECTIVITY BELGIUM BVBA, Kessel-Lo (BE)

(72) Inventors: Roger Alaerts, Aarschot (BE); Eric Schurmans, Geetbets (BE); Stephane Collart, Turnhout (BE); David Jan Irma Van Baelen, Winksele (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 423 days.

(21) Appl. No.: 15/998,421

(22) PCT Filed: Feb. 15, 2017

(86) PCT No.: PCT/EP2017/053397
§ 371 (c)(1),
(2) Date: Aug. 15, 2018

(87) PCT Pub. No.: WO2017/140725
PCT Pub. Date: Aug. 24, 2017

(65) Prior Publication Data
US 2020/0270094 A1    Aug. 27, 2020

Related U.S. Application Data

(60) Provisional application No. 62/295,427, filed on Feb. 15, 2016.

(51) Int. Cl.
*B65H 75/28* (2006.01)
*B65H 75/14* (2006.01)
*G02B 6/44* (2006.01)

(52) U.S. Cl.
CPC ............ *B65H 75/28* (2013.01); *B65H 75/14* (2013.01); *B65H 2701/32* (2013.01);
(Continued)

(58) Field of Classification Search
CPC ........ B65H 75/14; B65H 75/28; B65H 75/38; B65H 2701/32; G02B 6/4441; G02B 6/4457; G02B 6/4458; H02G 11/02
See application file for complete search history.

(56) References Cited

U.S. PATENT DOCUMENTS 5,069,523 A * 12/1991 Finzel ................. G02B 6/4454
385/135
5,668,910 A 9/1997 Arnett
(Continued)

OTHER PUBLICATIONS

International Search Report and Written Opinion of the International Searching Authority for International Patent Application No. PCT/EP2017/053397 dated May 11, 2017, 14 pages.

*Primary Examiner* — Sang K Kim
(74) *Attorney, Agent, or Firm* — Merchant & Gould P.C.

(57) ABSTRACT

A spool device (60, 90) for storing at least a portion of a telecommunications cable (800) in a storage configuration (870) includes a base (100, 600), a spool member (300, 700), and a loop engaging member (440, 740). The base (100, 600) includes a plurality of cable holders (110, 110x, 110y, 110a, 110p) configured for receiving a first portion (822, 822a, 822p) and a second portion (824, 824p) of the cable (800). The spool member (300, 700) is mounted to the base (100, 600) and includes a wrapping area (314, 714) that is configured for storing a coiled portion (826) of the cable (800). The loop engaging member (440, 740) is configured for engaging a looped portion (828) of the cable (800) and thereby secures at least the coiled portion (826) and the looped portion (828) of the cable (800). The spool device (60, 90) may be used as an adjustable overlength device for looped cable. The spool device (60, 90) may store and dispense the cable (800) while ends (802, 804) of the cable (800) remain connected to stationary first and second devices (902, 904), respectively.

20 Claims, 16 Drawing Sheets

(52) U.S. Cl.
CPC .......... *G02B 6/4441* (2013.01); *G02B 6/4457* (2013.01); *G02B 6/4458* (2013.01)

(56) References Cited

U.S. PATENT DOCUMENTS

| | | | |
|---|---|---|---|
| 6,215,938 B1* | 4/2001 | Reitmeier | G02B 6/4441 |
| | | | 385/134 |
| 6,408,124 B1* | 6/2002 | Holman | G02B 6/4453 |
| | | | 385/135 |
| 6,480,660 B1 | 11/2002 | Reitmeier et al. | |
| 7,359,611 B1* | 4/2008 | Kaplan | G02B 6/4457 |
| | | | 385/134 |
| 2002/0118944 A1 | 8/2002 | Burns et al. | |
| 2002/0172489 A1 | 11/2002 | Daoud et al. | |
| 2013/0209049 A1 | 8/2013 | Kowalczyk et al. | |
| 2013/0284843 A1 | 10/2013 | Mertesdorf | |
| 2016/0033733 A1* | 2/2016 | Burek | G02B 6/4457 |
| | | | 385/135 |
| 2017/0285286 A1* | 10/2017 | Haile-Mariam | G02B 6/4457 |
| 2017/0293100 A1* | 10/2017 | Solheid | G02B 6/443 |
| 2019/0079257 A1* | 3/2019 | Daoust | B65H 75/4471 |

* cited by examiner

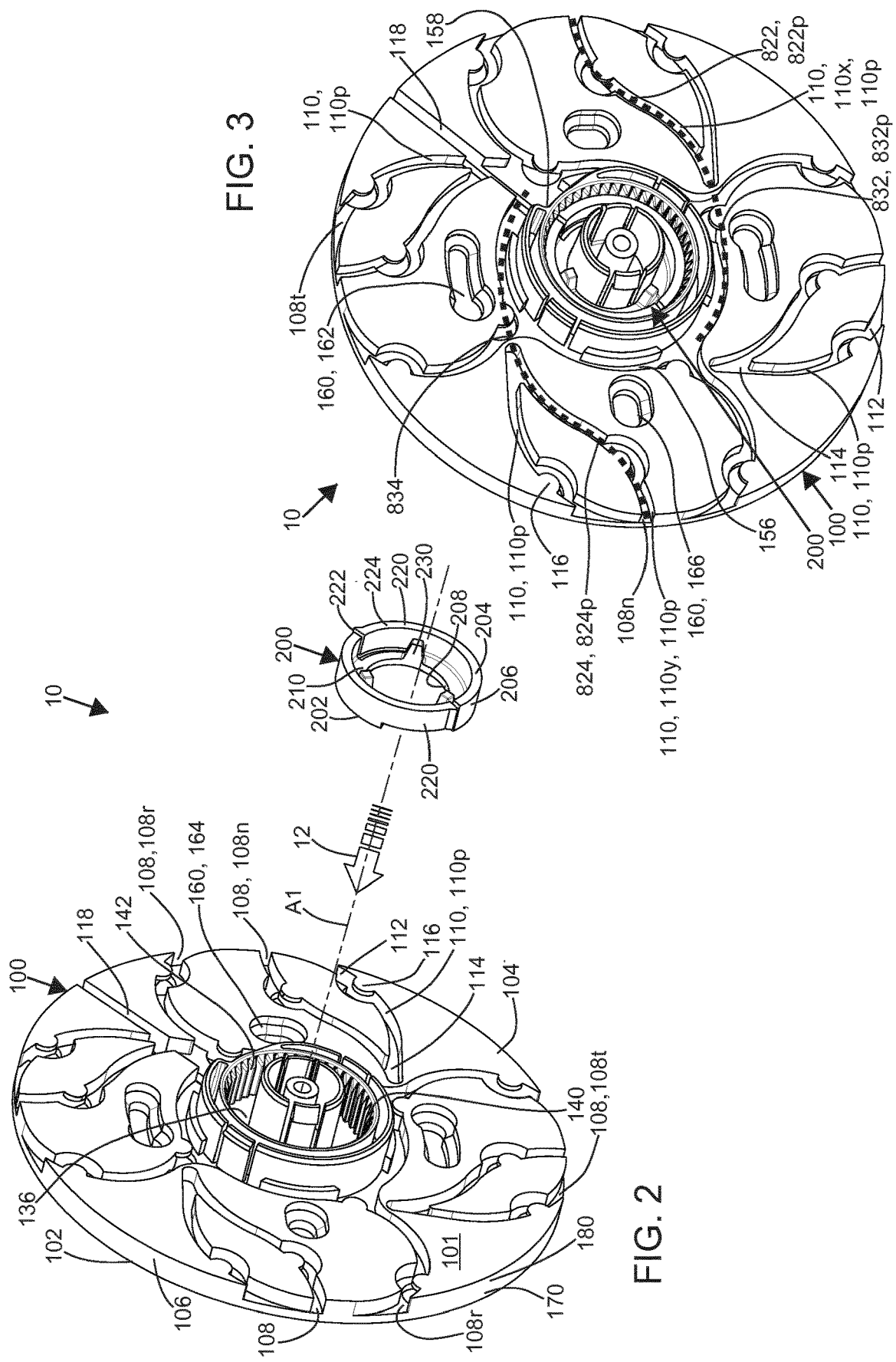

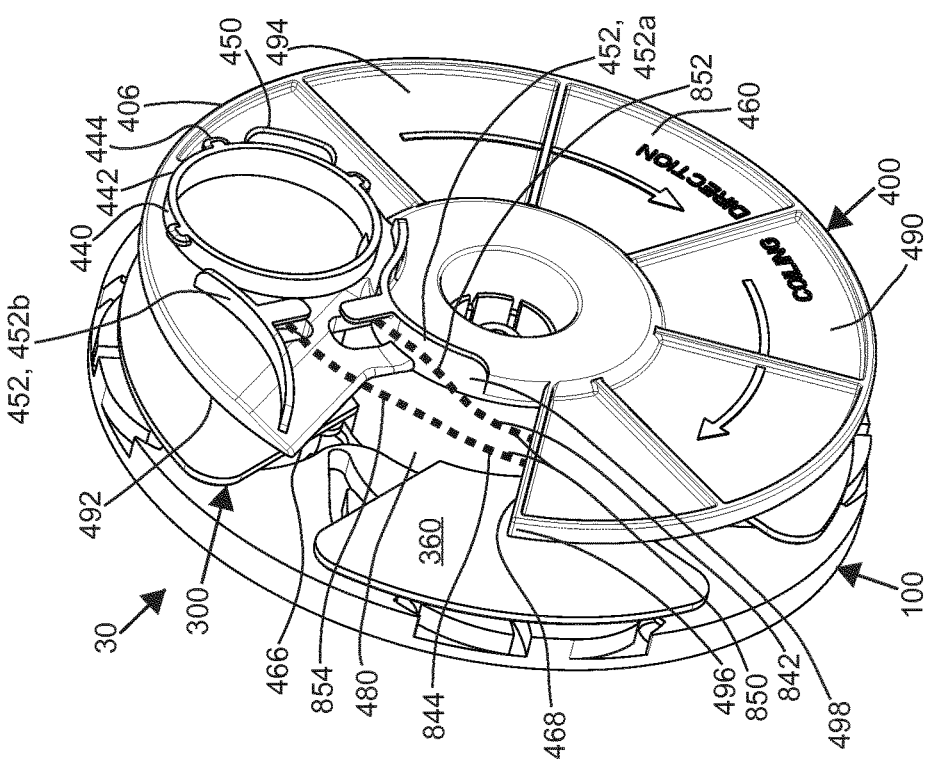
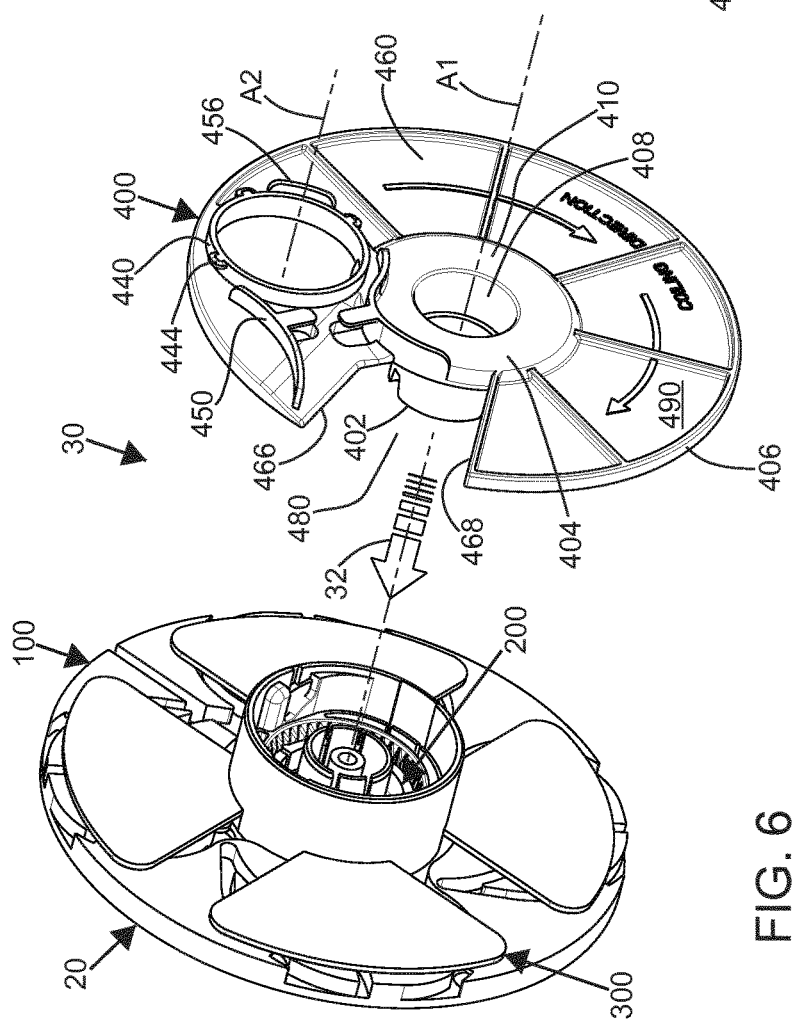

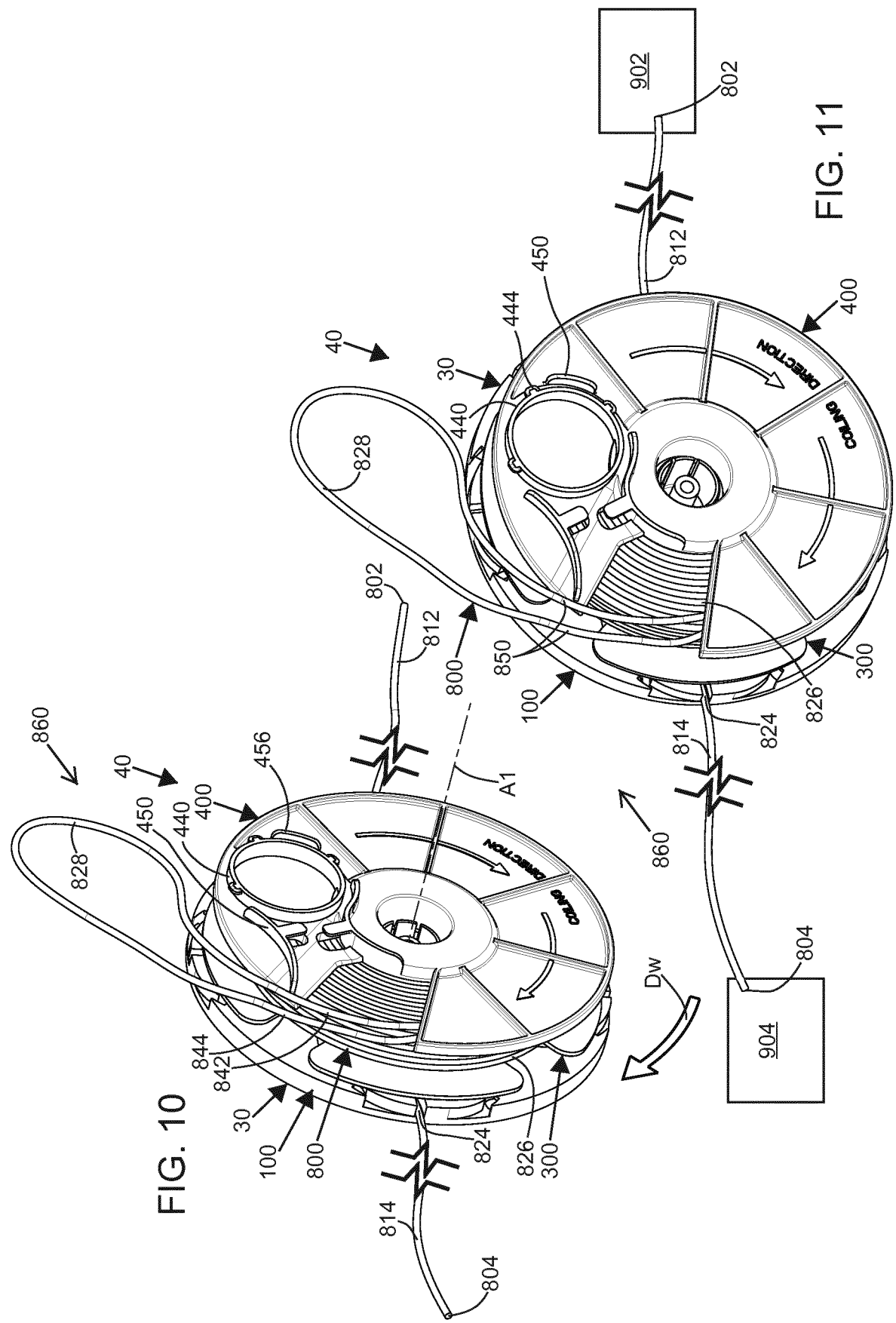

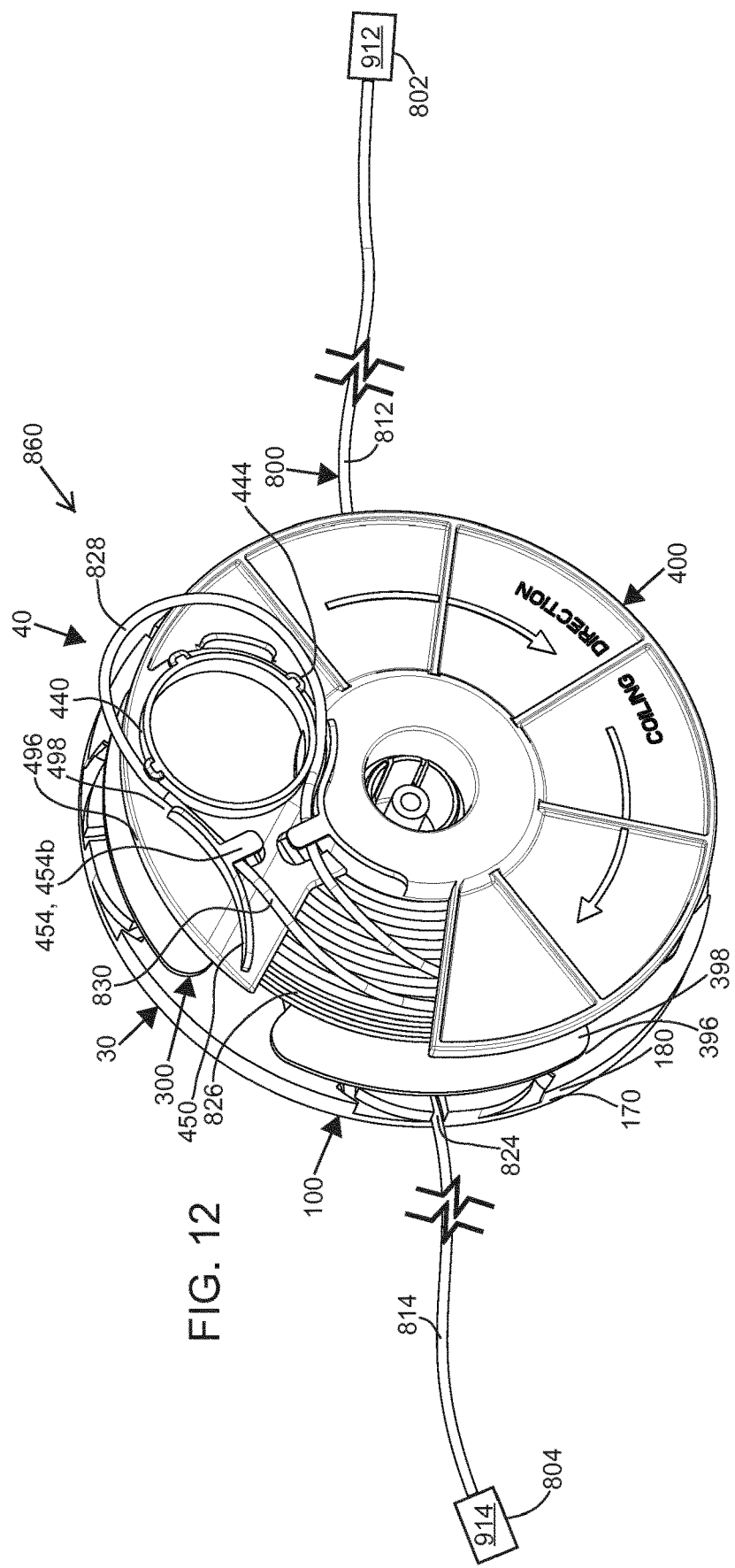

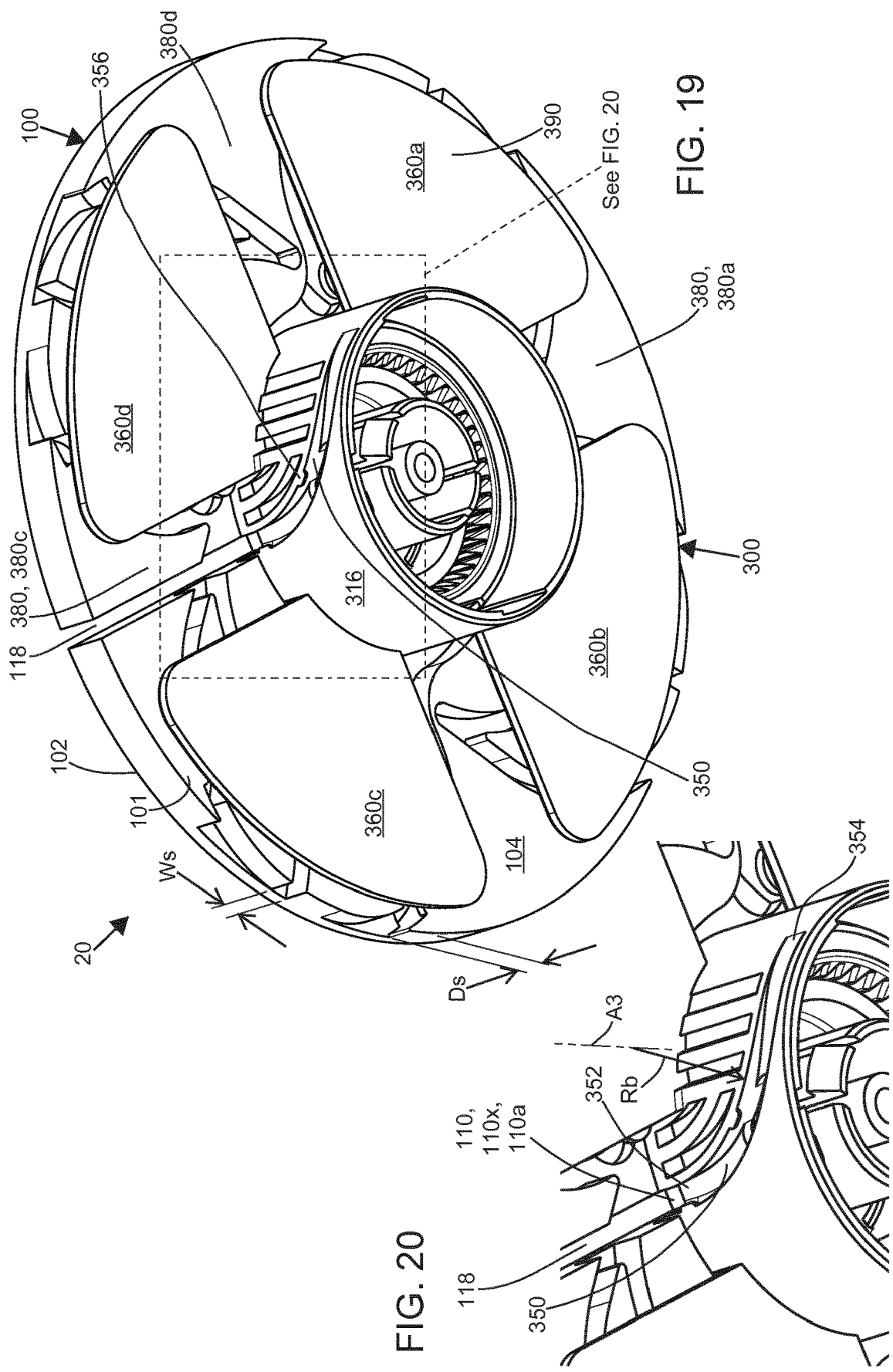

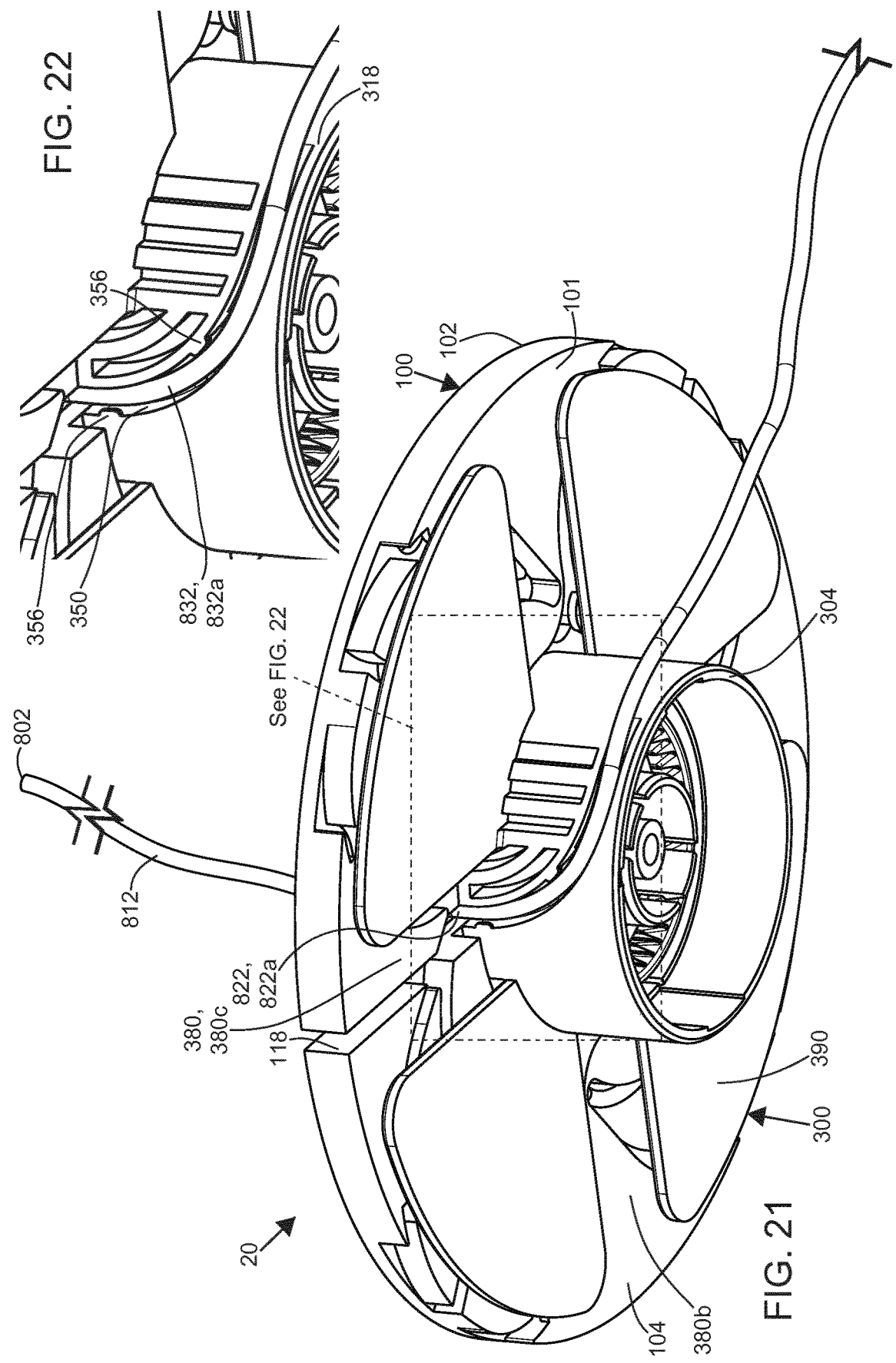

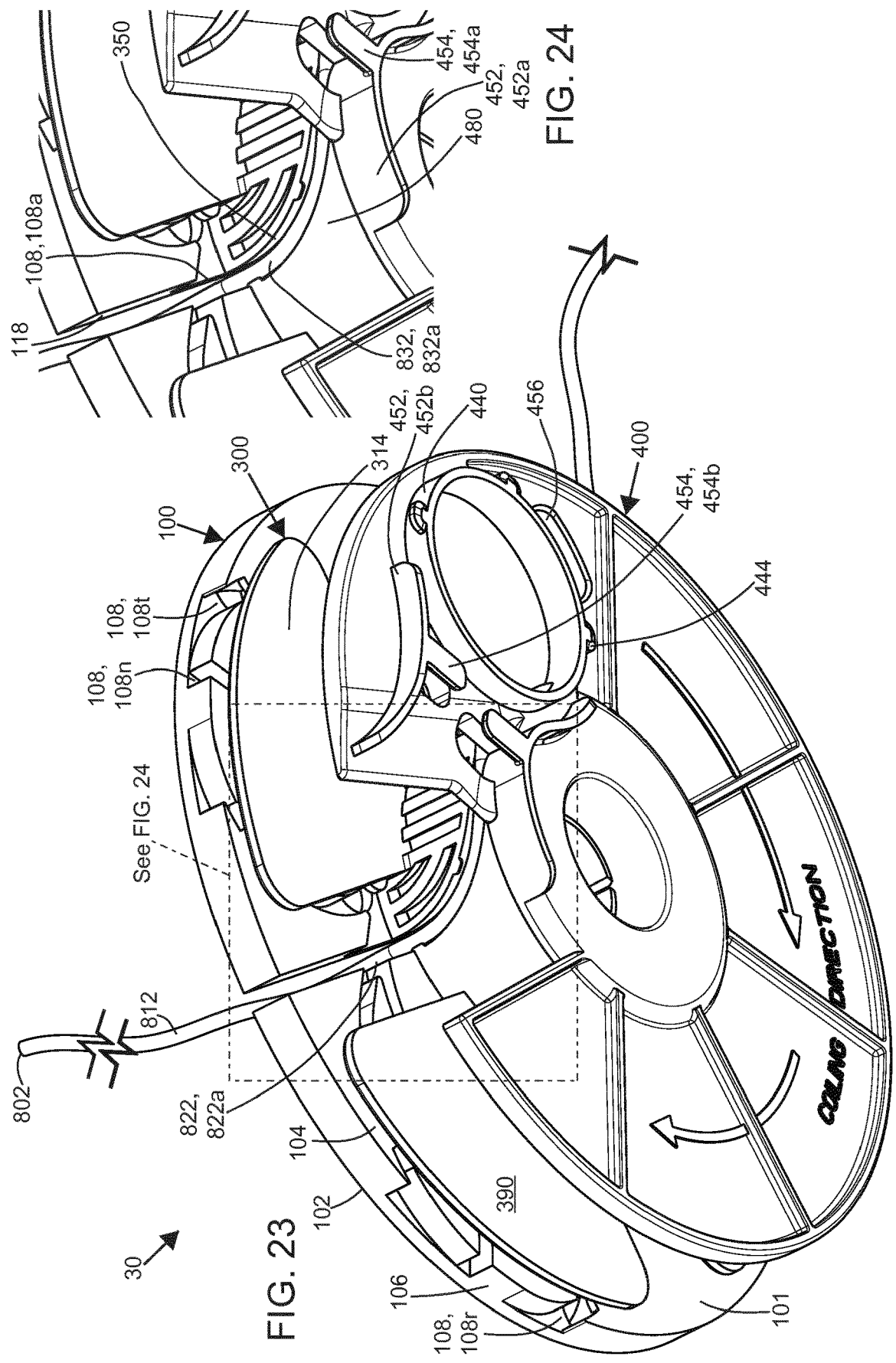

U.S. 11,225,393 B2

SPOOL WITH MULTI-POSITION LOOP KEEPER

CROSS-REFERENCE TO RELATED APPLICATION

This application is a National Stage of PCT/EP2017/053397, filed on Feb. 15, 2017, which claims the benefit of U.S. Patent Application Ser. No. 62/295,427, filed on Feb. 15, 2016, the disclosures of which is are incorporated herein by reference in their entireties. To the extent appropriate, a claim of priority is made to each of the above disclosed applications.

BACKGROUND

Spools, reels, cassettes, and cartridges can be used to store telecommunications cable (e.g., electrical cable and/or fiber optic cable). The spools typically include a hub or a drum about which the cable is wound. The hub of the spools is often cylindrical, and the cable is often wrapped around the cylindrical hub in a predominantly circumferential manner. By winding up the cable on the spool, the cable can be compactly stored and transported, protected from tangling and kinking, and kept ready for easy deployment.

The installation of a telecommunications cable of a given length between two devices that are fixed in location may result in an excess length of the telecommunications cable. The excess length of the telecommunications cable may be vulnerable to tangling and kinking, may be unsightly, and may not be compact.

SUMMARY

An aspect of the present disclosure relates to a spool device for storing at least a portion of a telecommunications cable in a storage configuration. The spool device includes a base, a spool member, and at least one loop engaging member. The base includes at least a first cable holder, configured for receiving a first portion of the telecommunications cable, and a second cable holder, configured for receiving a second portion of the telecommunications cable. The spool member is mounted to the base. The spool member includes a wrapping area configured for storing a coiled portion of the telecommunications cable. The at least one loop engaging member is configured for engaging a looped portion of the telecommunications cable and thereby securing at least the coiled portion and the looped portion of the telecommunications cable in the storage configuration.

Another aspect of the present disclosure includes a method of storing at least the portion of the above telecommunications cable on the above spool device. The method includes: a) providing the spool device, b) providing the telecommunications cable, c) looping the telecommunications cable, d) routing the first portion of the telecommunications cable, e) routing the second portion of the telecommunications cable, f) wrapping the telecommunications cable on the wrapping area, and g) securing the loop portion of the telecommunications cable on one of the at least one loop engaging member. The looping of the telecommunications cable forms the looped portion of the telecommunications cable. The routing of the first portion of the telecommunications cable is done at the first cable holder of the base. The routing of the second portion of the telecommunications cable is done at the second cable holder of the base. The wrapping of the telecommunications cable on the wrapping area forms the coiled portion of the telecommunications cable. And, the securing of the looped portion of the telecommunications cable secures at least the coiled portion and the looped portion of the telecommunications cable in the storage configuration.

Still other aspects of the present disclosure may include connecting a first end of the above telecommunications cable to a first mounted device prior to the wrapping of the telecommunications cable on the wrapping area and connecting a second end of the telecommunications cable to a second mounted device prior to wrapping the telecommunications cable on the wrapping area of the spool member.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 2 is an exploded perspective view of a sub-assembly of the spool device of FIG. 1, the sub-assembly including a base and a one-way member;

FIG. 3 is a perspective view of the sub-assembly of FIG. 2;

FIG. 6 is an exploded perspective view of a sub-assembly of the spool device of FIG. 1, the sub-assembly including the sub-assembly of FIG. 4 and a spool wall member;

FIG. 7 is a perspective view of the sub-assembly of FIG. 6;

FIG. 10 is a perspective view of the sub-assembly of FIG. 6 illustrated with a telecommunications cable routed through and wrapped about the sub-assembly;

FIG. 11 is another perspective view of the sub-assembly of FIG. 6 also illustrated with the telecommunications cable of FIG. 10 routed through and wrapped about the sub-assembly;

FIG. 12 is a perspective view of the sub-assembly of FIG. 6 also illustrated with the telecommunications cable of FIG. 10 routed through and wrapped about the sub-assembly, and also illustrated with a looped portion of the telecommunications cable of FIG. 10 approaching a loop engaging member of the spool wall member of FIG. 6;

FIG. 19 is a perspective view of the sub-assembly of FIG. 4;

FIG. 20 is an enlarged portion of FIG. 19, as called out at FIG. 19;

FIG. 21 is another perspective view of the sub-assembly of FIG. 4 illustrated with a portion of the telecommunications cable of FIG. 10 routed therethrough;

FIG. 22 is an enlarged portion of FIG. 21, as called out at FIG. 21;

FIG. 23 is a perspective view of the sub-assembly of FIG. 6 illustrated with a portion of the telecommunications cable of FIG. 10 routed therethrough; and FIG. 24 is an enlarged portion of FIG. 23, as called out at FIG. 23.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
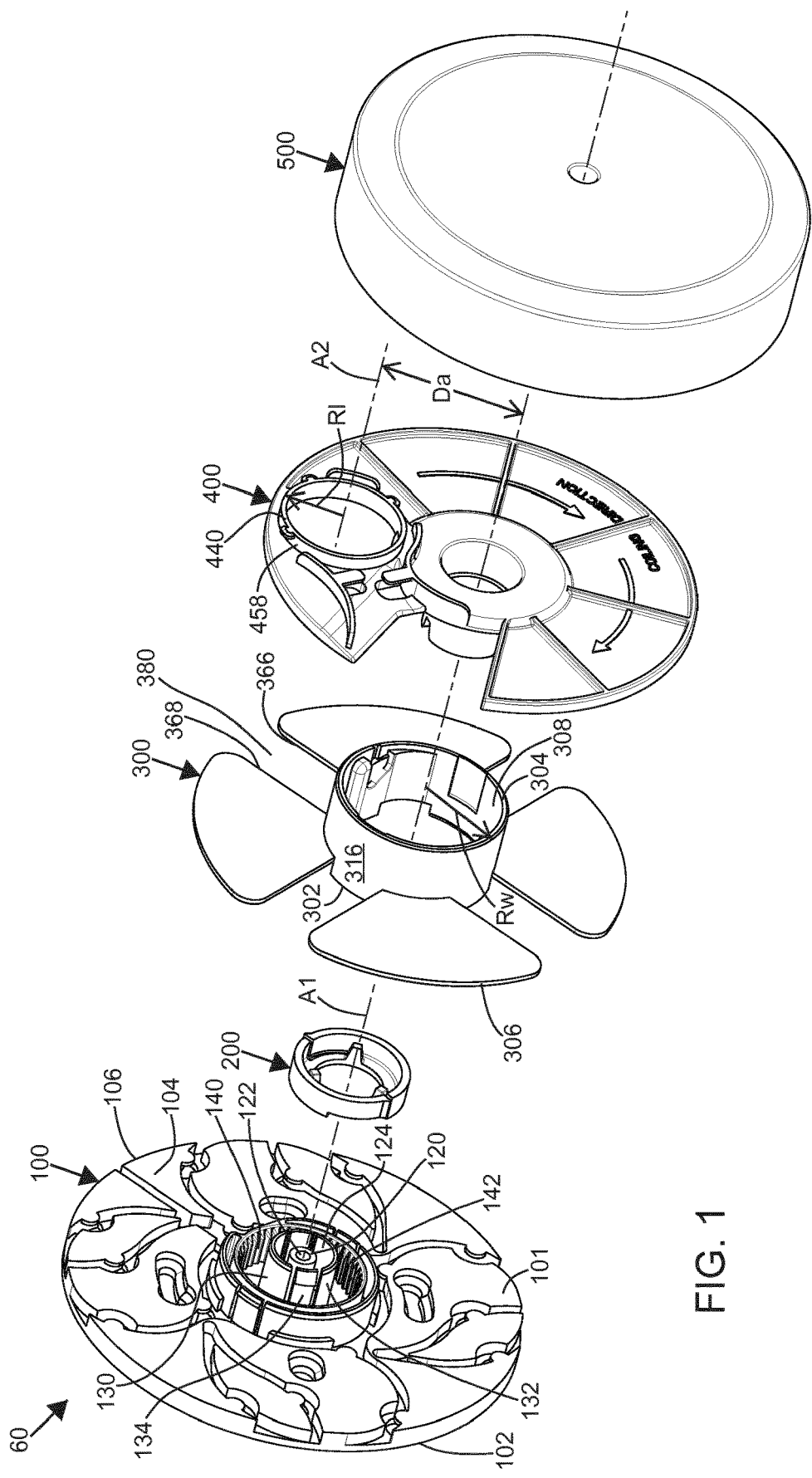
FIG. 1 is an exploded perspective view of a spool device, according to the principles of the present disclosure.
Figure 14:
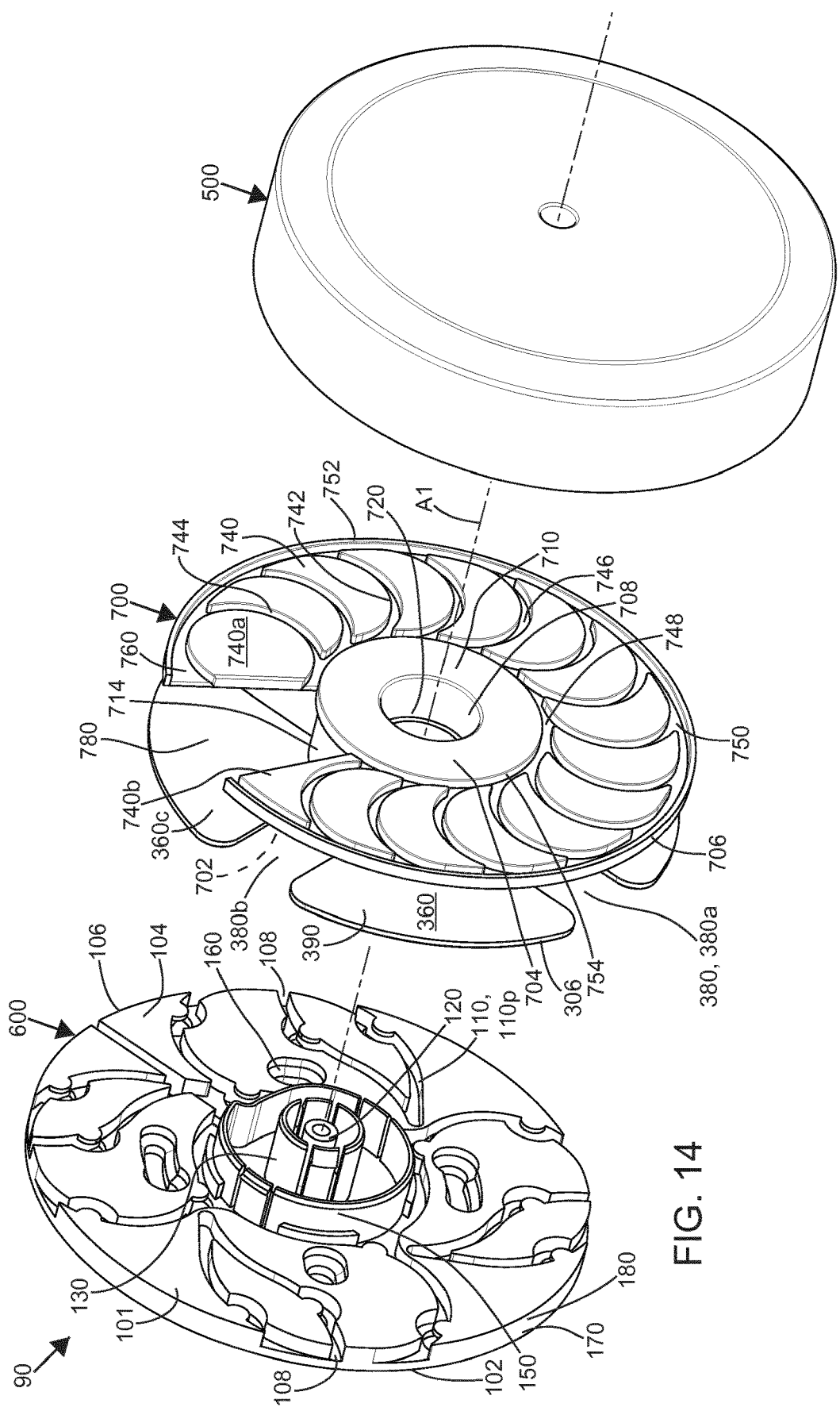
FIG. 14 is an exploded perspective view of another spool device, according to the principles of the present disclosure.

According to the principles of the present disclosure, a spool device 60 may store a telecommunications cable 800. In addition, the telecommunications cable 800 may be retrieved from the spool device 60. As illustrated at FIG. 1, the spool device 60 may include a base 100, a one-way member 200, a spool member 300, a spool wall member 400, and a cover 500. Another spool device 90 is illustrated at FIG. 14. The spool device 90 includes a base 600, a spool member 700, and the cover 500. As illustrated at FIGS. 10 and 15, the telecommunications cable 800 may be wrapped about the spool member 300 of the spool device 60 and similarly may be wrapped about the spool member 700 of the spool device 90.

Figure 15:
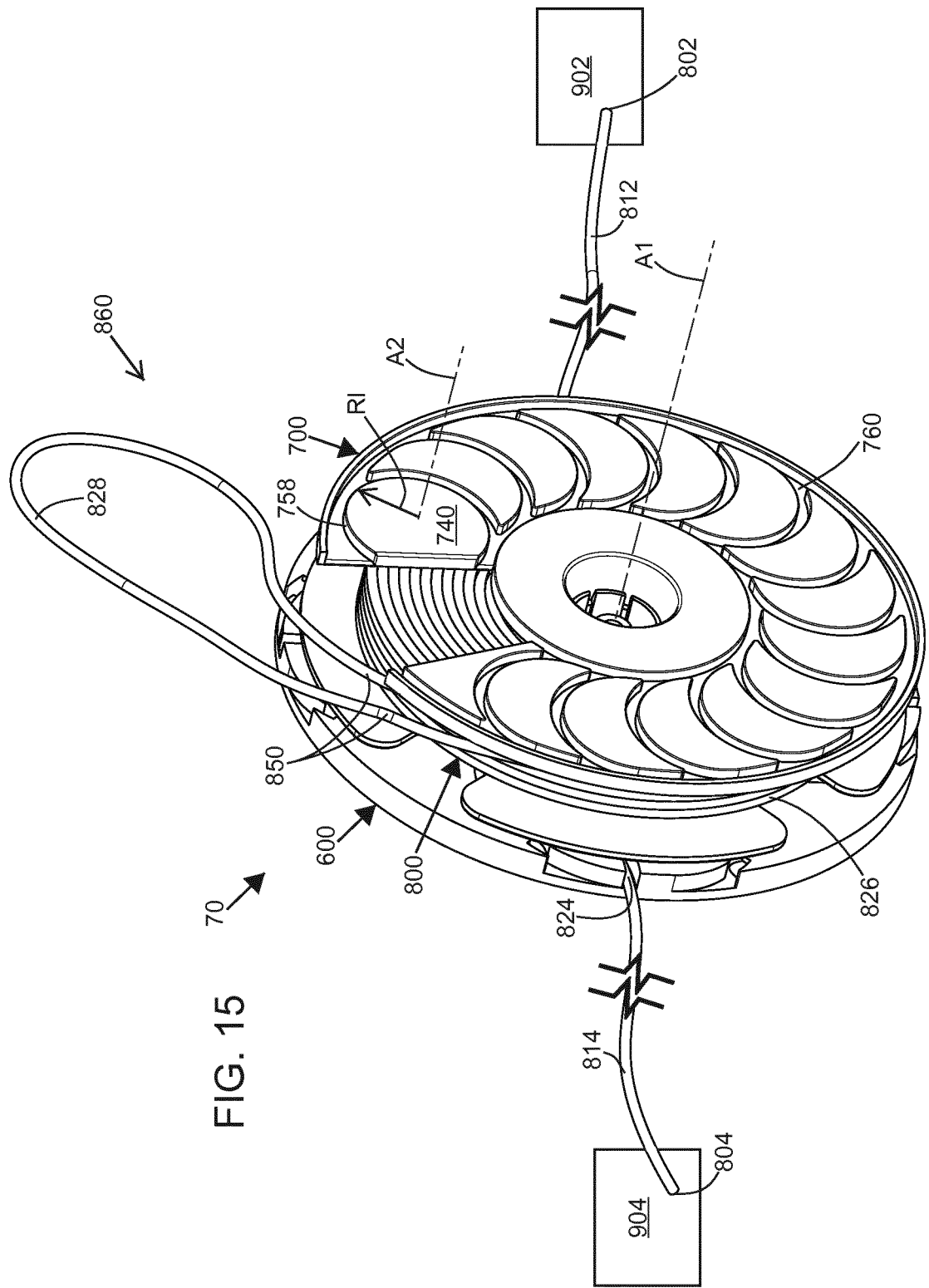
FIG. 15 is a perspective view of a sub-assembly of the spool device of FIG. 14 illustrated with the telecommunications cable of FIG. 10 routed through and wrapped about the sub-assembly and ends of the telecommunications cable connected to fixed telecommunication devices, respectively.
Figure 16:
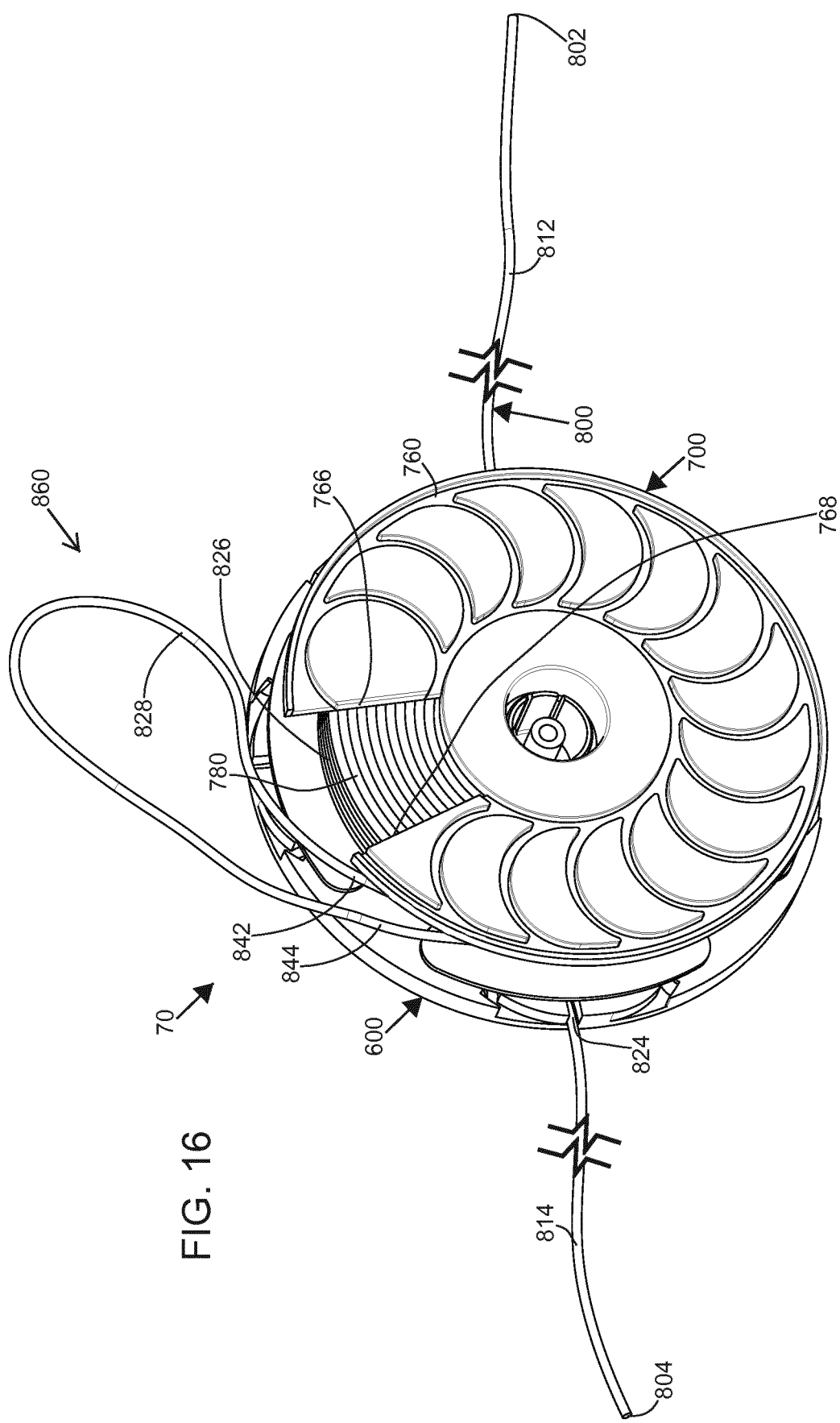
FIG. 16 is a perspective view of the sub-assembly of FIG. 15 with the telecommunications cable of FIG. 10 routed through and wrapped about the sub-assembly.
Figure 17:
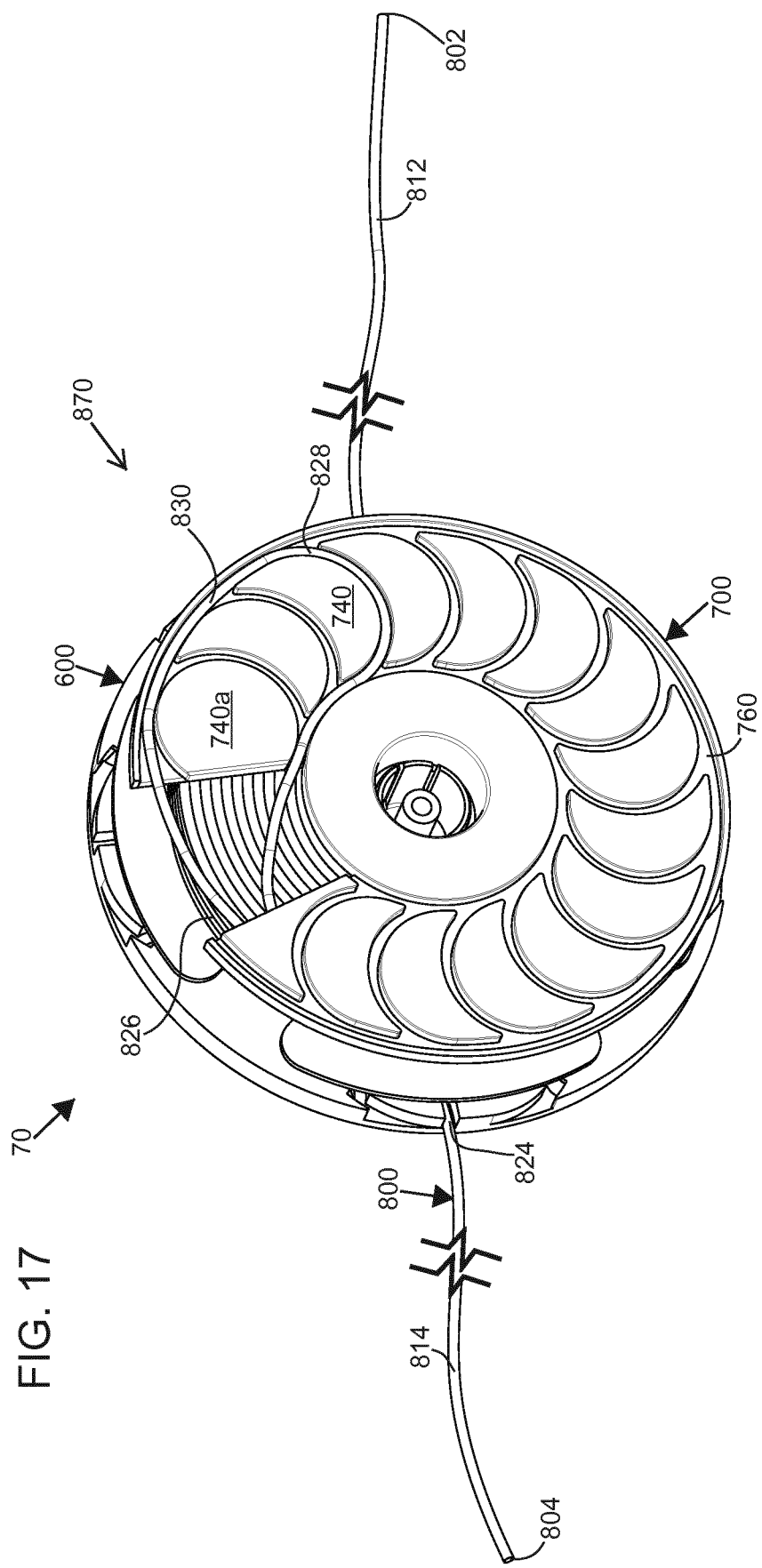
FIG. 17 is a perspective view of the sub-assembly of FIG. 15 with the telecommunications cable of FIG. 10 routed through and wrapped about the sub-assembly and also illustrated with a looped portion of the telecommunications cable engaged with a loop engaging member of a spool member of the spool device of FIG. 14.
Figure 18:
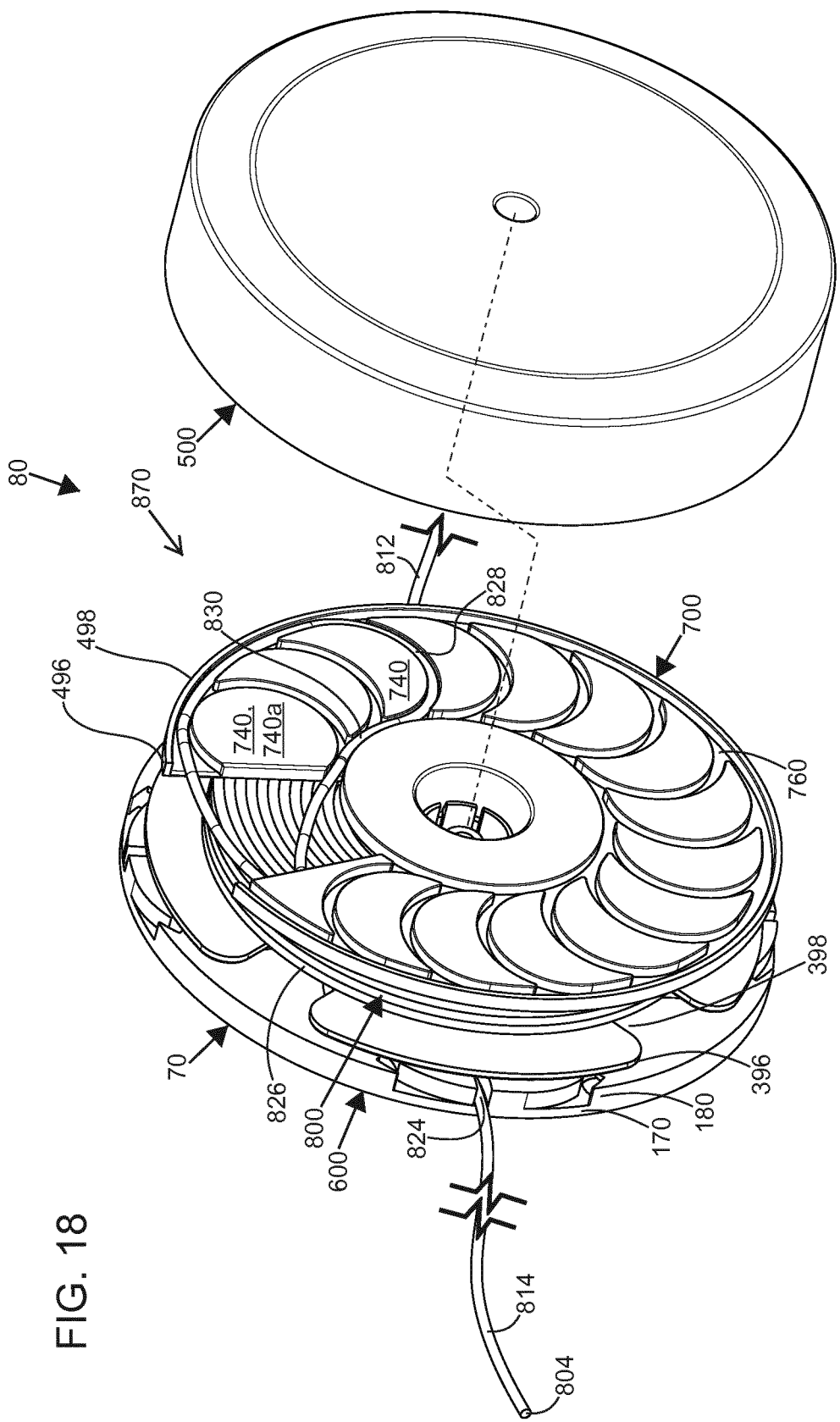
FIG. 18 is an exploded perspective view of the spool device of FIG. 14 illustrated with the telecommunications cable of FIG. 10 routed through and wrapped about the spool device and also illustrated with the looped portion of FIG. 17 engaged with the loop engaging member of FIG. 17.

FIGS. 10 and 15 illustrate an example application of the spool devices 60, 90. In particular, a first end 802 of the telecommunications cable 800 is connected to a first device 902. Similarly, a second end 804 of the telecommunications cable 800 is connected to a second device 904. According to the principles of the present disclosure, the first device 902 may be a mounted device 902, and the second device 904 may be a mounted device 904. The mounted devices 902, 904 may be attached to a telecommunications cabinet, a telecommunications device, a computer, and/or other devices that are stationary and not typically moved. The first end 802 of the telecommunications cable 800 may remain connected to the first device 902, and/or the second end 804 of the telecommunications cable 800 may remain connected to the second device 904 when a portion of the telecommunications cable 800 is wrapped and/or unwrapped from the spool device 60, 90. Furthermore, the first device 902 and/or the second device 904 may remain in position while the portion of the telecommunications cable 800 is wrapped about the spool device 60, 90 and/or unwrapped from the spool device 60, 90. The ability to wrap and/or unwrap the telecommunications cable 800 while the ends 802, 804 of the telecommunications cable 800 remain connected and/or at a fixed location makes the spool device 60, 90 useful for storing excess length of the telecommunications cable 800 and/or for adjusting a routing of the telecommunications cable 800 between the devices 902, 904.

The first end 802 of the telecommunications cable 800 may be permanently connected to a component (e.g., the first device 902). The first end 802 may be spliced, fusion spliced or otherwise connected to the component. As illustrated at FIG. 12, a connecting element 912 may be positioned at the first end 802. The connecting element 912 may be a fiber optic connector, an electrical connector, a splice, etc. The second end 804 of the telecommunications cable 800 may be permanently connected to a component (e.g., the first device 904). The second end 804 may be spliced, fusion spliced or otherwise connected to the component. As illustrated at FIG. 12, a connecting element 914 may be positioned at the second end 804. The connecting element 914 may be a fiber optic connector, an electrical connector, a splice, etc.

The telecommunications cable 800 may be a patch cord. Patch cords typically are connectorized at each of their ends. Thus, the connecting element 912 at the first end 802 of the telecommunications cable 800 may be a connector (e.g., a fiber optic connector, an electrical connector, etc.). Likewise, the connecting element 914 at the second end 804 of the telecommunications cable 800 may be a connector (e.g., a fiber optic connector, an electrical connector, etc.). The first device 902 and/or the second device 904 may be configured to releasably receive the connecting elements 912 and/or 914 (e.g., the connectors).

An example application of the spool device 60, 90 being used to take up excess lengths of the telecommunications cable 800 will be further described below. It may be desired to connect the first device 902 to the second device 904 with the telecommunications cable 800. The devices 902, 904 may be at various distances with respect to each other and a routing path for the telecommunications cable 800 may travel across a variety of obstacles of unknown size and position. The telecommunications cable 800 may be ordered taking into account the distance between the devices 902, 904 and allowing for the routing path between the devices 902, 904. An excess length of the telecommunications cable 800 may be ordered to accommodate unknowns along the cable route and/or to select a standard length of the telecommunications cable 800 (e.g., 100 meters, 250 meters, etc.). Upon connecting the first end 802 of the telecommunications cable 800 to the first device 902 and connecting the second end 804 to the second device 904, the excess length of the telecommunications cable 800 may become tangled, may occupy more space than desired, may appear unsightly, and/or may be vulnerable to environmental hazards. By coiling up the excess portion of the telecommunications cable 800 on the spool device 60, 90, the routing between the devices 902, 904 can follow a clean, neat, and organized route and the excess portion of the telecommunications cable 800 may be stored within the spool device 60, 90. In addition, as the ends 802, 804 may remain connected while the excess portion of the telecommunications cable 800 is wrapped about the spool device 60, 90, there is no need to disconnect the devices 902, 904 from each other while finalizing the routing of the telecommunications cable 800.

An example application of using the spool device 60, 90 when adjusting either the position of one or both of the mounting devices 902, 904 and/or adjusting the route of the telecommunications cable 800 between the devices 902, 904 will be discussed below. From time to time, it may be desired to rearrange either one or both of the devices 902, 904. Additionally, the telecommunications cable 800 may need to be rerouted between the devices 902, 904. It may be desired to leave a connection provided by the telecommunications cable 800 in operation while the devices 902, 904 are moved and/or the route of the telecommunications cable 800 is rerouted. The spool device 60, 90 allows the stored portion of the telecommunications cable 800 to be unwound from the spool device 60, 90 thereby providing excess cable length between the devices 902, 904 without disconnection of the devices 902, 904. The devices 902 and/or 904 may then be moved within the limits of the overall length of the telecommunications cable 800. Similarly, the route of the telecommunications cable 800 may be rerouted within the constraints of the overall length of the telecommunications cable 800. Upon the devices 902, 904 being repositioned and/or the telecommunications cable 800 being rerouted, the resulting excess length and/or the remaining excess length of the telecommunications cable 800 may be wound upon the spool device 60, 90.

As described above in the example applications and in additional applications known to those of skill in the art of routing and/or connecting telecommunications cables, the spool device 60, 90 may serve as an adjustable overlength device for telecommunications cable. As illustrated at FIG. 2, the base 100, 600 may include a variety of mounting elements 160 (e.g., mounting holes, mounting slots, etc.) that allow the base 100, 600, and thereby the spool device 60, 90, to be conveniently attached against a wall, a cabinet, or other convenient location. The telecommunications cable 800 may be wrapped about the spool device 60, 90 before and/or after the base 100, 600 is secured to its mounting location. Upon the excess portion of the telecommunications cable 800 being wrapped about the spool member 300, 700 of the spool device 60, 90, the cover 500 may be positioned over the spool member 300, 700.

Turning now to FIGS. 1-13 and 19-24, the spool device 60 will be described in detail. As illustrated at FIGS. 2 and 3, the base 100 includes a plurality of the mounting elements 160. In particular, the mounting elements 160 include a mounting slot pair 162 positioned about a central longitudinal axis A1 of the spool device 60. The mounting slot pair includes two mounting slots with one end of the slots enlarged so as to accommodate a head of a mounting fastener. The base 100 may thereby be attached to the wall, the cabinet, etc. by positioning the enlarged ends (e.g., hole portions) over the heads of pre-positioned fasteners and, upon the fasteners reaching through the enlarged ends, the base 100 may be turned and the heads of the mounting fasteners thereby positioned over the opposite end of the slots. The mounting fasteners may be tightened to secure the base 100 to the wall, or the mounting fasteners may fit snugly or otherwise not need to be tightened upon the base 100 being rotated into the mounted position. The base 100 may be mounted by itself, or as part of the spool device 60. The spool device 60 may be mounted to the attachment fasteners as an assembly and may be mounted with or without the telecommunications cable 800 wound about. As illustrated at FIGS. 2 and 3, the mounting elements 160 may further include a mounting slot 164 and/or a mounting slot 166. The mounting slots 164, 166 may accommodate varying fastener positions about a length of the mounting slots 164, 166.

As depicted, the base 100 includes a base plate 101 that extends between a first side 102 and a second side 104. In the depicted embodiment, the base plate 101 defines a perimeter 106 that is a cylindrical perimeter. As depicted, the base 100 includes a plurality of entrance/exits 108. To accommodate a variety of applications and a variety of orientations of routes for the telecommunications cable 800, the plurality of entrance/exits 108 may include axial entrance/exits 108a, perimeter entrance/exits 108n, perimeter entrance/exits 108r, and perimeter entrance/exits 108t. As illustrated at FIGS. 23 and 24, the axial entrance/exit 108a is oriented substantially perpendicular to the first side 102 of the base plate 101 and substantially parallel to the central longitudinal axis A1. As illustrated at FIGS. 2 and 3, the perimeter entrance/exits 108n are oriented substantially normal to the perimeter 106 of the base plate 101. The tangent perimeter entrance/exits 108r are oriented substantially tangential to the perimeter 106 of the base plate 101. Likewise, the perimeter entrance/exits 108t are oriented substantially tangential to the perimeter 106 of the base plate 101.

As illustrated at FIG. 10, a rotational wrapping direction Dw is defined for the spool device 60. As illustrated at FIG. 10, the wrapping direction Dw is clockwise as viewed when looking at the spool device 60 mounted on a wall. In other embodiments, the wrapping direction Dw may be reversed. As illustrated at FIG. 2, the perimeter entrance/exits 108r are reversing tangential perimeter entrance/exits as they receive a portion of the telecommunications cable 800 in a direction opposite from the wrapping direction Dw. Conversely, the perimeter entrance/exits 108t receive a portion of the telecommunications cable 800 in the wrapping direction Dw and therefore are non-reversing tangential perimeter entrance/exits 108t. The perimeter entrance/exits 108n, 108r, and 108t may thereby receive a portion of the telecommunications cable 800 in a variety of orientations and guide the telecommunications cable 800 for wrapping about the spool member 300 in the wrapping direction Dw. The axial entrance/exit 108a is able to receive a portion of the telecommunications cable 800 at the first side 102 of the base plate 101 as it is routed to and/or from the spool member 300 (e.g., through a wall duct). As depicted, a single portion of the telecommunications cable 800 is illustrated entering/exiting the first side 102 of the base plate 101. In other embodiments, two portions of the telecommunications cable 800 may enter/exit through one or more of the axial entrance/exit 108a.

As illustrated at FIGS. 2, 3, and 20, a plurality of cable holders 110 are provided on the base 100. The plurality of cable holders 110 includes one or more of cable holders 110a and one or more of cable holders 110p. As illustrated at FIG. 20, the cable holder 110a guides the telecommunications cable 800 upon entrance from the axial entrance/exit 108a. Likewise, the cable holder 110p holds and guides the telecommunications cable 800 upon entrance from the perimeter entrance/exits 108n, 108r, and 108t. The cable holders 110 thereby serve to guide the telecommunications cable 800 as it passes between the exterior of the spool device 60 and the interior of the spool device 60. The cable holders 110 thereby extend between a first end 112 at the perimeter 106 or at the first side 102 of the base plate 101 and a second end 114 at the interior of the spool device 60 (i.e., an interior end). To retain the telecommunications cable 800 within the cable holder 110, a plurality of keepers 116 may be provided.

As illustrated at FIG. 2, the keepers 116 extend partially over the cable holder 110 and thereby hold the telecommunications cable 800 within the cable holder 110. As depicted, the cable holder 110 may take a form of a cable guiding channel, a cable guiding groove, a cable guiding slot, a cable guiding hole, etc. The channel, groove, slot, hole, etc. of the cable holder 110 may include a widened portion adjacent the keeper 116. Upon insertion into the cable holder 110, the telecommunications cable 800 may be pressed into the widened portion, and upon clearing the keeper 116, the telecommunications cable 800 may tend to straighten and thereby position itself beneath the keeper 116.

As the cable holders 110 are slot shaped in the depicted embodiments, there is no need to thread the telecommunications cable 800 through the cable holder 110. The telecommunications cable 800 may thereby remain connected at the ends 802, 804 when positioning the portions of the telecommunications cable 800 into the cable holders 110.

As illustrated at FIGS. 19-24, a radial slot 118 is positioned between the cable holder 110a and the perimeter 106 of the base plate 101 (see FIG. 23). As the radial slot 118 is opened to the perimeter 106, the telecommunications cable 800 may be positioned within the cable holder 110a without disconnecting the ends 802, 804.

As depicted at FIG. 1, the base 100 further includes a fastener stand 120. The fastener stand 120 may include a fastener hole 122 (e.g., a threaded hole) positioned along the central longitudinal axis A1. In other embodiments, alternative fastening methods may be provided. The fastener hole 122 may include threads and thereby receive a threaded fastener to retain the cover 500, connected to the fastener stand 120 at the fastener hole 122. In the depicted embodiment, a recess 124 is provided around the fastener stand 120.

As further illustrated at FIG. 1, the base 100 may further include a first mount 130. In the depicted embodiment, the first mount 130 is a releasable mount 130. As depicted, the first mount 130 includes a pair of partially cylindrical members 132. Positioned between the partially cylindrical members 132 is a pair of retainers 134. In the depicted embodiment, the retainers 134 are a pair of opposing latches 134. In the depicted embodiment the opposing latches 134 may deflect inwardly together and thereby receive a catch 422 of the spool wall member 400 and thereby retain the spool wall member 400. The recess 124, between the fastener stand 120 and the pair of opposing latches 134, permit the pair of opposing latches 134 to deflect inwardly. As illustrated at FIG. 2, a recess 136 is provided outside of the first releasable mount 130. As depicted, the recesses 124 and 136 are annular recesses that are centered about the central longitudinal axis A1. As also depicted, the first releasable mount 130 is generally centered on the central longitudinal axis A1.

A one-way interface 140 is provided on the base 100. In particular, the one-way interface 140 is provided on the outside portion of the recess 136. As depicted, the one-way interface 140 includes a plurality of one-way elements 142. In the depicted embodiment, the one-way elements 142 are a plurality of ratchet teeth.

Figure 4:
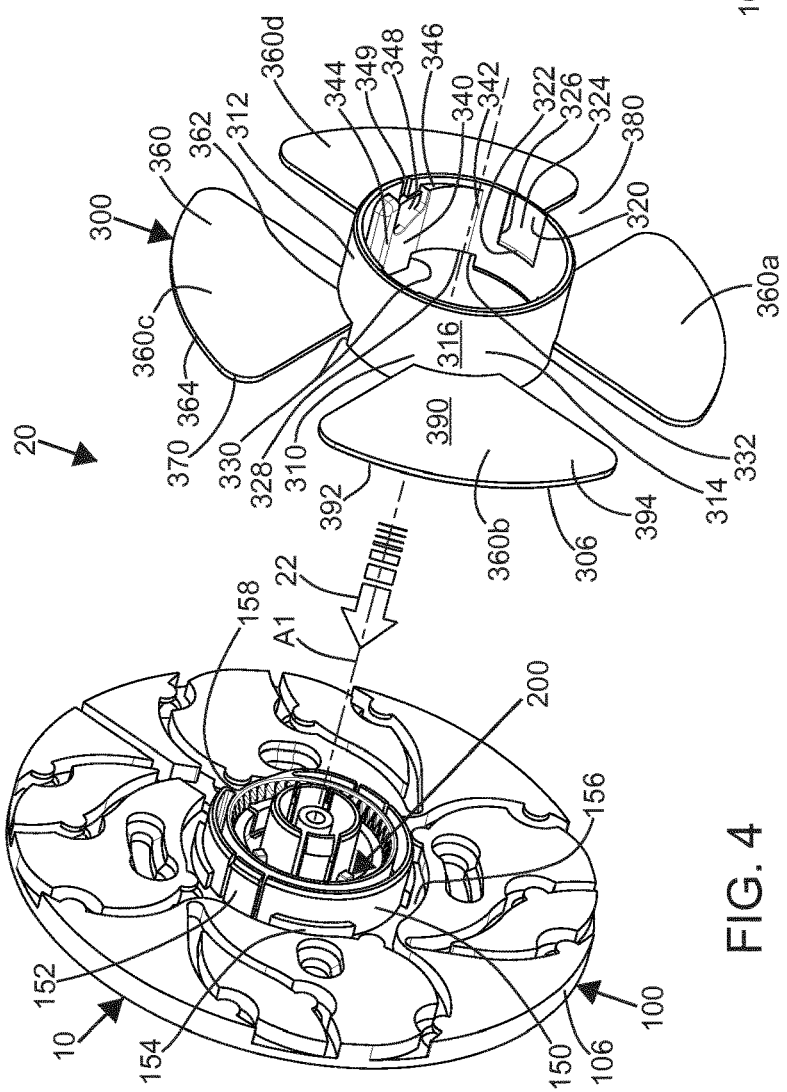
FIG. 4 is an exploded perspective view of a sub-assembly of the spool device of FIG. 1, the sub-assembly including the sub-assembly of FIG. 2 and a spool member.

As illustrated at FIG. 4, the base 100 further includes a second mount 150. The second mount 150 may include a pair of opposing latches 152 (i.e., a retainer). In other embodiments, alternative retainers may be used. The second mount 150 may further include alignment keys 154. An annular recess 156 may hold the alignment keys 154. The second mount 150 may be generally cylindrical and extend along the central longitudinal axis A1. In the depicted embodiment, a recess 158 is provided on the second mount 150. As will be further described hereinafter, the recess 158 accommodates routing of the telecommunications cable 800 through the axial entrance/exit 108a and the axially extending cable holder 110a. The second mount 150 is adapted to retain the spool member 300, and the recess 158 is adapted to uniquely rotationally orient the spool member 300 with respect to the base 100. In the depicted embodiment, the recess 158 is a wedge-shaped recess. In the depicted embodiment, the recess 158 extends along a longitudinal direction substantially parallel with the central longitudinal axis A1. The annular recess 156 may accommodate a first side 302 of the spool member 300 as the spool member 300 is mounted to the base 100.

The spool wall member 400 is configured to rotate in the wrapping direction Dw (see FIG. 10) with respect to the base 100. The spool wall member 400 is prevented from substantially rotating opposite the wrapping direction Dw. In the depicted embodiment of the spool device 60, this selective rotational relationship between the spool wall member 400 and the base 100 is facilitated by the one-way member 200. In the depicted embodiment, a ratchet system is illustrated. In other embodiments, other one-way members may be used (e.g., a one-way clutch, etc.).

As illustrated at FIG. 2, the one-way member 200 extends between a first end 202 and a second end 204. The one-way member 200 is generally annular in shape and extends between an outer surface 206 and an inner surface 208. As depicted, a flange 210 may extend to the inner surface 208. Along a ring adjacent the outer surface 206, a pair of one-way elements 220 are positioned with a cantilevered arm 224 extending and curving along the outer surface 206. At a cantilevered end of the cantilevered arm 224, a pawl 222 extends above the otherwise generally cylindrical surface of the outer surface 206. Adjacent the inner surface 208 and extending from the flange 210 are a set of engagement members 230. In the depicted embodiment, three of the engagement members 230 extend toward the second end 204 from the flange 210. In particular, the engagement members 230 extend from a base end 232, adjacent the flange, 210 to an extended end 234. The engagement member 230 further includes opposing sides 236. In the depicted embodiment, the opposing sides 236 are tapered and narrow as the engagement member 230 extends toward the second end 204.

As illustrated at FIGS. 2 and 3, the one-way member 200 may be installed into the base 100 and thereby form a sub-assembly 10 of the spool device 60. In particular, the one-way member 200 is inserted into the recess 136 of the base 100 along a direction of arrow 12. The pair of opposing latches 134 may engage the inner surface 208 of the one-way member 200 and thereby prevent the one-way member 200 from inadvertently separating from the base 100 after installation. FIG. 3 illustrates the one-way element 220 installed in the base 100.

Figure 5:
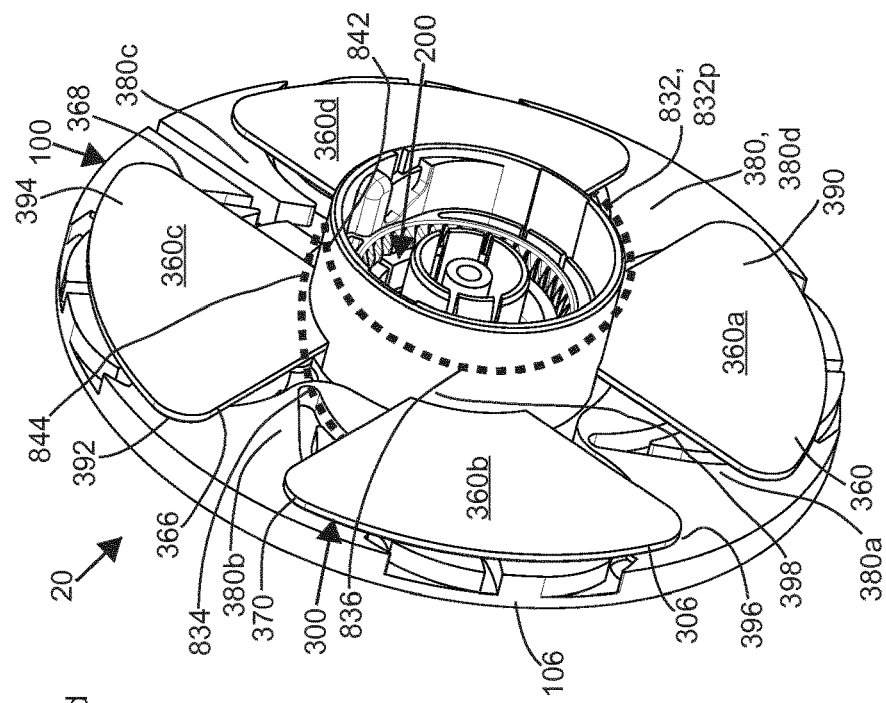
FIG. 5 is a perspective view of the sub-assembly of FIG. 4.

Turning now to FIG. 4, the spool member 300 will be described in detail. The spool member 300 extends between the first side 302 and a second side 304 (see FIG. 1). The spool member 300 includes a wall 390 with a first side 392 and a second side 394. As depicted, the wall 390 includes a plurality of partition members 360. In the depicted embodiment, four partition members 360a, 360b, 360c, and 360d are included in the wall 390. In other embodiments, more than four or fewer than four partition members 360 may be included on the wall 390. The partition members 360 each extend between a first edge 362 and a second edge 364. The second edges 364, taken together, generally define a perimeter 306 of the wall 390. As illustrated at FIGS. 1 and 5, the partition members 360 extend between a third edge 366 and a fourth edge 368. A radius 370 may be formed at intersections of the edges 364, 366, 368. The edges 366 and 368 of adjacent partition members 360 form a set of cable passages 380 through the wall 390. In particular, a cable passage 380a is formed between the partition member 360a and 360b. Likewise, a cable passage 380b is formed between the partition member 360b and the partition member 360c. Likewise, a cable passage 380c is formed between the partition member 360c and 360d. And, a cable passage 380d is formed between the partition member 360d and the partition member 360a. In the depicted embodiment, the cable passages 380 are slot-like. As the cable passages 380 are each open to the perimeter 306, the telecommunications cable 800 may be positioned within the cable passages 380 without disconnecting the ends 802, 804.

The wall 390 generally extends perpendicular to a hub 310 of the spool member 300. The hub 310 extends between the first side 302 and the second side 304 of the spool member 300. As depicted, the hub 310 includes an exterior 312 that is substantially cylindrically shaped. A cable wrapping area 314 is formed on the exterior 312 of the hub 310. A wrapping surface 316 may be defined on the exterior 312 of the hub 310. A lip 318 of the hub 310 may be inserted into an annular groove 414 of the spool wall member 400.

The spool member 300 may include an interior 308. As depicted, the interior 308 of the spool member 300 is substantially defined by an interior of the hub 310.

The spool member 300 may further include a mount engaging arrangement 320. The mount engaging arrangement 320 is adapted to mount the spool member 300 to the base 100. In particular, the mount engaging arrangement 320 may include one or more catches 322 and/or notches 328. In the depicted embodiment, a pair of the catches 322 is formed by latch engaging shoulders of the catches 322. A pair of latch reliefs 324 extends from the latch engaging shoulders of the catches 322 to the second side 304 of the spool member 300. At the first side 302 of the spool member 300, a plurality of the notches 328 are formed within the hub 310. The notches 328 each include a pair of notch edges 330 and a notch bottom 332. The notch edges 330 may serve as anti-rotation features. Alternatively or additionally, latch relief edges 326 may form anti-rotation features.

As illustrated at FIGS. 19-24, the spool member 300 may further include one or more grooves 350 that accommodate routing of the telecommunications cable 800 when routed to the axial entrance/exit 108a. In particular, the groove 350 extends between a first end 352 and a second end 354. The groove 350 may generally sweep an angle of about 90 degrees about an axis A3 (see FIG. 20). The groove 350 generally extends below the wrapping surface 316 of the spool member 300. The groove 350 may allow positioning of the telecommunications cable 800 below the surface 316 of the spool member 300 at the first end 352 of the groove 350. As the groove 350 progresses toward the second end 354, a depth of the groove 350 diminishes to zero. The depth of the groove 350 at the first end 352 may be about the same as a depth of the cable holders 110. As illustrated at FIG. 19, the depth of the cable holders 110 is illustrated by a dimension Ds. As the telecommunications cable 800 passes along the groove 350 from the first end 352 to the second end 354, the telecommunications cable 800 gradually rises above the wrapping surface 316 of the hub 310. At the second end 354 of the groove 350, the telecommunications cable 800 is fully above the wrapping surface 316. The groove 350 thereby approaches the wrapping surface 316 in a tangential manner at the second end 354. The groove 350 guides the telecommunications cable 800 from an axial orientation, substantially parallel to the central longitudinal axis A1, to an orientation substantially tangential to the wrapping surface 316 at the second end 354. The telecommunications cable 800 is oriented substantially parallel to the wall 390 at the second end 354 of the groove 350.

To retain the telecommunications cable 800 within the groove 350, one or more keepers 356 may be provided. The interior 308 of the spool member 300 may accommodate the groove 350 with a set of inwardly extending features. In particular, a ramp 340 is included on the interior 308 of the spool member 300. The ramp 340 extends from a tangent end 342 to a raised end 344. The ramp 340 further extends between a longitudinal end 346 and the notch bottom 332 and/or the first end 302 of the spool member 300. The ramp 340 therefore takes a form of a wedge, a key, etc. As illustrated at FIG. 4, the ramp 340 extends generally in a longitudinal direction parallel to the central longitudinal axis A1. The raised end 344 may generally correspond with the first end 352 of the groove 350, as more depth is needed there. Conversely, the tangent end 342 of the ramp 340 may correspond with the second end 354 of the groove 350, as diminishing depth is required there. A pocket 348 may be included that generally corresponds to the curvature of the groove 350 as it extends between the first end 352 and the second end 354. A slot 349 may further extend between the pocket 348 and the second side 304 of the spool member 300.

As the raised end 344 of the ramp 340 extends between the first end 302 and the longitudinal end 346, the raised end 344 may serve as a key for orienting the spool member 300 with the base 100. The ramp 340 is shaped to be received by the recess 158. The spool member 300 thereby mounts to the base 100 in a unique orientation relative to the base 100.

Turning now to FIGS. 4 and 5, the installation of the spool member 300 onto the base 100 is illustrated and will now be described in detail. To assemble the spool member 300 onto the base 100 of the sub-assembly 10 and thereby form a sub-assembly 20 of the spool device 60, the spool member 300 and the base 100 are aligned along the central longitudinal axis A1 with the first side 302 of the spool member 300 facing the second side 104 of the base plate 101. The spool member 300 is then slid into the base 100 along the direction of arrow 22 (see FIG. 4). In particular, the alignment keys 154 of the base 100 are engaged with the notches 328 of the spool member 300. In addition, the ramp 340 may be engaged with the recess 158. As the spool member 300 is pushed inwardly along the direction of the arrow 22, the opposing latches 152 deflect inwardly until the latches 152 reach the catches 322. Upon the latches 152 reaching the catches 322, the latches 152 extend outwardly and engage the catches 322. The latches 152 may occupy the pair of latch reliefs 324. FIG. 5 illustrates the spool member 300 mounted to the base 100.

Figure 9:
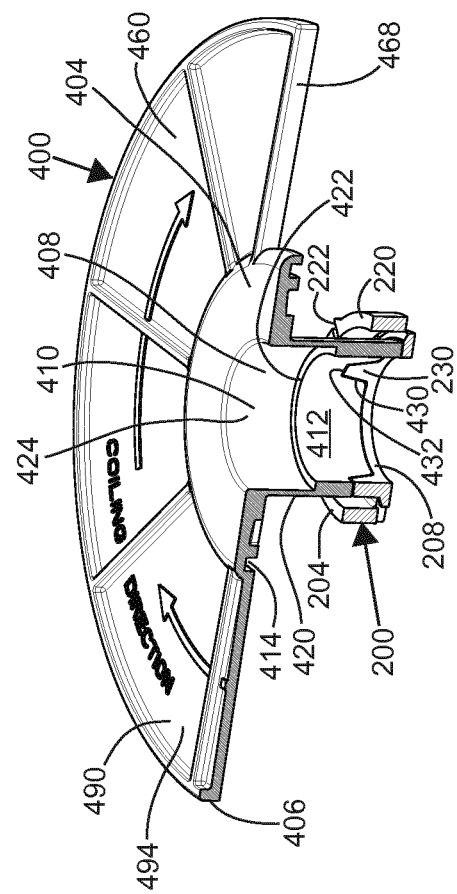
FIG. 9 is a cross-sectional perspective view of the spool wall member of FIG. 6 and the one-way member of FIG. 2.
Figure 8:
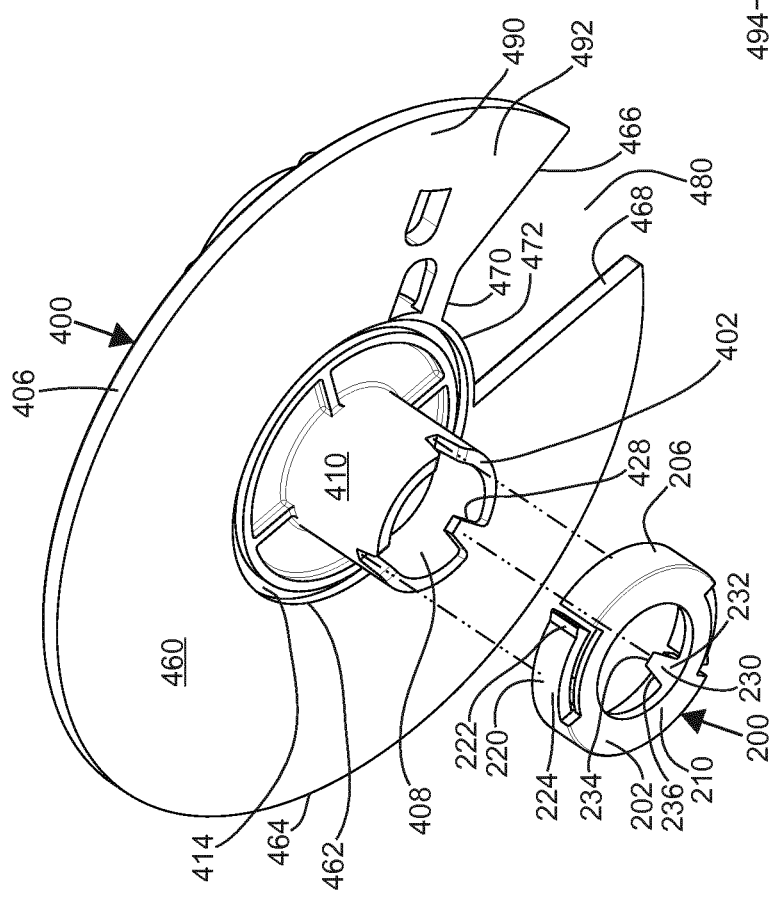
FIG. 8 is an exploded perspective view of the spool wall member of FIG. 6 and the one-way member of FIG. 2.

Turning now to FIG. 6, the spool wall member 400 will be described in detail. The spool wall member 400 extends between a first side 402 and a second side 404. As depicted, a hub 410 extends between the first side 402 and the second side 404. A wall 490 projects radially outwardly away from the hub 410 to a perimeter 406 of the spool wall member 400. As illustrated at FIG. 8, the hub 410 is substantially cylindrical at an exterior surface and extends inwardly to an interior 412. As depicted, the interior 412 is substantially the same as an interior 408 of the spool wall member 400. As illustrated at FIG. 9, the interior 412 of the hub 410 includes a mount engaging arrangement 420. In particular, the catch 422 is formed within the interior 412 of the hub 410. A latch relief 424 extends from the catch 422 to the second side 404 of the spool wall member 400. As depicted the catch 422 is a latch engaging shoulder. In other embodiments, the mount engaging arrangement 420 may take other forms. As depicted, a plurality of notches 428 extends inwardly from the first side 402 of the spool wall member 400. The notches 428 extend between the exterior of the hub 410 and the interior 412 of the hub 410. As depicted, three of the notches 428 are equally distributed along a circumference of the hub 410. In other embodiments, more than three or fewer than three notches 428 may be used. The notches 428 project toward the second side 404 of the spool wall member 400 to a notch bottom 432. Each of the notches 428 is defined by a pair of notch edges 430. In the depicted embodiment, the notches 428 are tapered and extend inwardly as the notches 428 extend toward the second side 404.

The wall 490 extends between a first side 492 and a second side 494. The first side 492 of the wall 490 includes the annular groove 414. The hub 410 extends outwardly away from the first side 492 of the wall 490.

A cable passage 480 extends through the wall 490. The wall 490 thereby includes a spool wall partition member 460 that extends between a first end 462, adjacent the annular groove 414, and a second end 464 that generally defines the perimeter 406 of the spool wall member 400. The spool wall partition member 460 circumferentially extends between a third edge 466 and a fourth edge 468. As depicted at FIG. 8, the cable passage 480 is slot-like and extends between the third edge 466 and the fourth edge 468 down to a bottom 472. A chamfer 470 may be included between the bottom 472 and the third edge 466. The cable passage 480 is thereby open outwardly in a radial direction away from the hub 410. As the cable passage 480 is open to the perimeter 406, the telecommunications cable 800 may be positioned within the cable passage 480 without disconnecting the ends 802, 804.

Turning again to FIG. 6, features on the second side 404 of the spool wall member 400 will be described in detail. A loop engaging member 440 extends outwardly from the second side 494 of the wall 490. As depicted, the loop engaging member 440 includes a cylindrical surface 442 that may provide radial support for the telecommunications cable 800. As illustrated at FIG. 6, the loop engaging member 440 defines an axis A2 that extends substantially parallel to the central longitudinal axis A1. As illustrated at FIG. 1, the axis A2 is spaced from the central longitudinal axis A1 by a distance Da. The loop engaging member 440 further defines a radius R1.

To retain the telecommunications cable 800 adjacent the loop engaging member 440, a radial keeper 456 may be provided. A plurality of retainers 444 may further be provided to position the telecommunications cable 800 against the second side 494 of the wall 490. The retainers 444 and the radial keeper 456 may be included in a cable guide arrangement 450. The cable guide arrangement 450 further includes a pair of guides 452. The pair of guides 452 includes a first guide 452a and a second guide 452b. The pair of guides 452 guide the telecommunications cable 800 as it approaches the loop engaging member 440. To keep the telecommunications cable 800 positioned adjacent the second side 494 of the wall 490, adjacent the pair of guides 452, a pair of keepers 454 may extend inwardly together from the pair of guides 452. A gap is formed between the pair of keepers 454 thereby allowing the telecommunications cable 800 to be positioned within the keepers 454 and adjacent the guides 452 without disconnecting the ends 802, 804. As depicted, a first keeper 454a of the pair of keepers 454 extends from the guide 452a and a second keeper 454b of the pair of keepers 454 extends from the guide 452b.

Turning again to FIGS. 6 and 7, the installation of the spool wall member 400 onto the base 100 and into engagement with the one-way member 200 will be described in detail. To install the spool wall member 400 onto the base 100 of the sub-assembly 20 and thereby form a sub-assembly 30 of the spool device 60, the spool wall member 400 and the base 100 are aligned along the central longitudinal axis A1. Upon alignment, the spool wall member 400 is slid along a direction of arrow 32 along the central longitudinal axis A1. As illustrated at FIGS. 8 and 9, as the first side 402 of the spool wall member 400 approaches the one-way member 200, the spool wall member 400 may be rotated about the central longitudinal axis A1 until the notches 428 are aligned with the engagement members 230 of the one-way element 220. As the engagement members 230 are inserted into the notches 428, the spool wall member 400 and the one-way member 200 become rotationally engaged with each other. As the pawls 222 are engaged with the teeth 142 of the base 100, rotation of the spool wall member 400 may substantially only occur in the wrapping direction Dw. It is understood that a small amount of backlash, deformation, or other minor effects may be present that allow a small amount of rotation opposite the wrapping direction Dw. Thus, by indicating that rotation may substantially only occur in the wrapping direction Dw, these minor effects are neglected. Upon continued insertion of the spool wall member 400 into the base 100, the pair of opposing latches 134 deform inwardly toward each other until the catch 422 is reached. Upon the catch 422 being reached by the pair of opposing latches 134, the pair of opposing latches 134 spread outwardly and engages the catch 422. The pair of opposing latches 134 may occupy the latch relief 424 upon spreading apart. FIG. 7 illustrates the spool wall member 400 engaged with the base 100. As the one-way member 200 is rotationally engaged between the base 100 and the spool wall member 400, the spool wall member 400 is selectively rotatably mounted to the base 100 and may rotate relative to the base 100 in the wrapping direction Dw.

Figure 13:
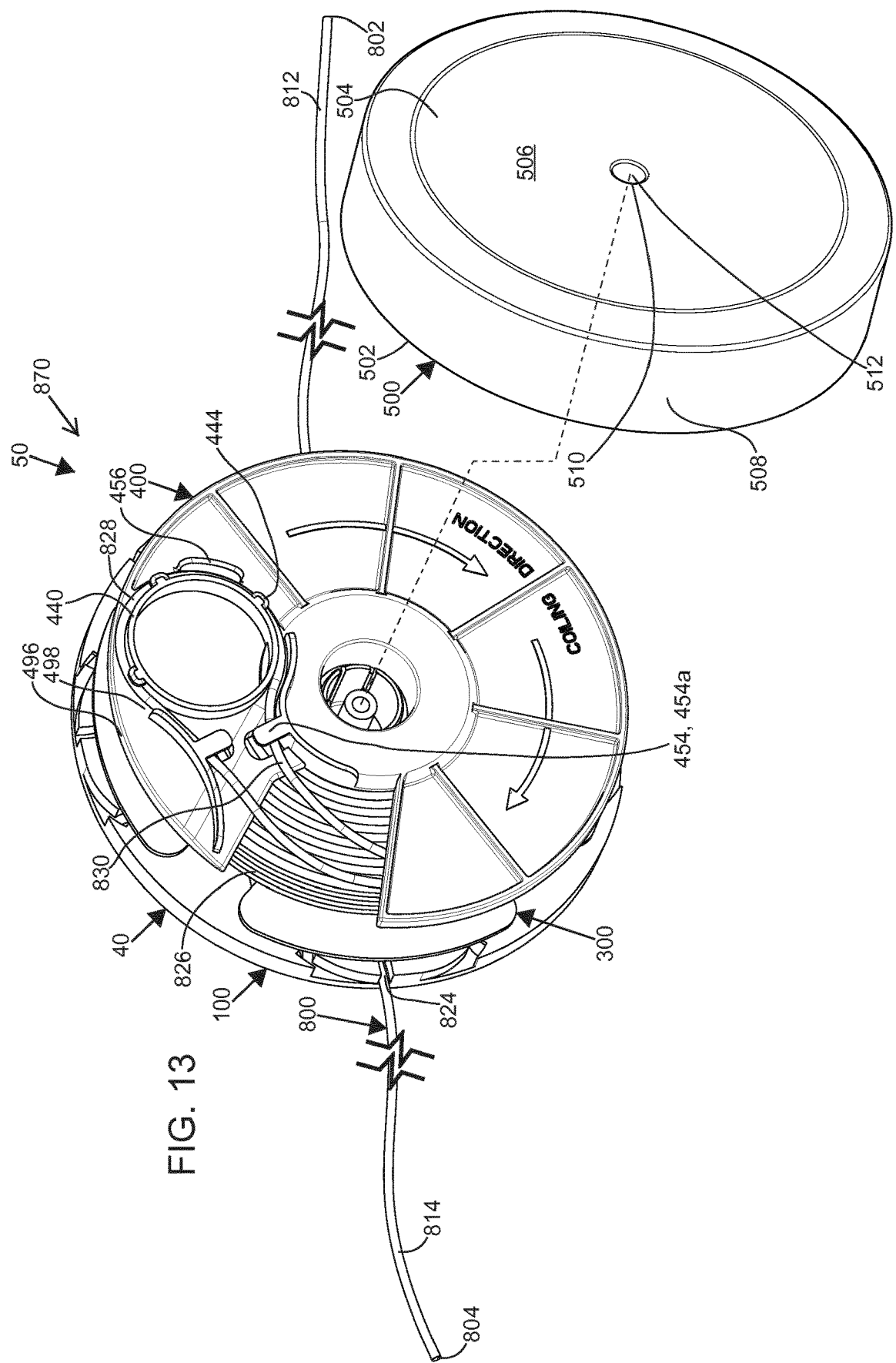
FIG. 13 is an exploded perspective view of the spool device of FIG. 1 illustrated with the telecommunications cable of FIG. 10 routed through and wrapped about the spool device and the looped portion of FIG. 12 engaged with the loop engaging member of FIG. 12.

Turning now to FIG. 13, the cover 500 will be described in detail. The cover 500 extends between a first side 502 and a second side 504. At the second side 504, an end wall 506 substantially covers the second side 504. A fastener hole 512 may extend through the end wall 506 and thereby allow a fastener to be inserted through the fastener hole 512 and engage the fastener hole 122 of the base 100 and thereby attach the cover 500 to the base 100. The fastener hole 512 and the fastener may be included in an attachment arrangement 510. In other embodiments, alternative methods of fastening and/or attaching the cover 500 to the base 100 may be used. The cover 500 further includes a perimeter wall 508 that extends from the first side 502 to the second side 504 and joins the end wall 506. The cover 500 may be installed over the loop engaging member 440 and other portions of the spool wall member 400 and further over the spool member 300 and thereby substantially cover the telecommunications cable 800 held by the spool device 60.

An example method of storing a portion of the telecommunications cable 800 on the spool device 60 will now be described in detail. As the cover 500 is removed while the telecommunications cable 800 is installed, the telecommunications cable 800 is installed on the sub-assembly 30 (see FIG. 7) and thereby forms sub-assembly 40 (see FIG. 10). Upon installing the cover 500 upon the sub-assembly 40, a spool device and cable assembly 50 is formed (see FIG. 13).

In the example method, the telecommunications cable 800 extends between the first end 802, mounted to the first device 902, and the second end 804 mounted to the second device 904. A first exterior portion 812 may extend from a short distance to a substantial distance away from the first device 902, and a second exterior portion 814 may extend from a short distance to a substantial distance away from the second device 904. An amount from a small amount or a substantial amount of excess telecommunications cable 800 may be present upon routing the telecommunications cable 800 along a desired route between the devices 902, 904. If the excess portion of the telecommunications cable 800 exceeds the capacity of the spool device 60, multiple spool devices 60 may be used to store the excess telecommunications cable 800. At approximately a desired mounting location of the spool device 60, a looped portion 828 may be formed of the excess telecommunications cable 800. The looped portion 828 extends in a first direction along the telecommunications cable 800 toward the first end 802 along a first strand 842 and also extends in a second direction along the telecommunications cable 800 toward the second end 804 along a second strand 844. The first and second strands 842, 844 together form a pair of strands 850. The strands 842, 844 of the pair of strands 850 may generally run together, may be twisted together, not twisted together, or may be sporadically twisted together, as might happen when wrapping the pair of strands 850 without particular concern for them twisting or not twisting together.

If the first end 802 is mounted to the first device 902 and the second end 804 is mounted to the second device 904 prior to routing and storing the telecommunications cable 800 in the spool device 60, there should be no inadvertent excess slack or length shortages of telecommunications cable 800 along the routed path. In particular, the spool device 60 may be placed at any convenient location along the intended routed path, the first exterior portion 812 and the second exterior portion 814 may be neatly positioned, as desired, along the routed path with no inadvertent excess slack. Length shortages are likewise avoided as the telecommunications cable 800 may be ordered or configured longer than the routed path. As the final step in routing the telecommunications cable 800 is winding the excess length about the spool device 60, none of the excess length need be accumulated outside of the spool device 60.

If the first exterior portion 812 and the second exterior portion 814 approach the spool device 60 from different directions, as illustrated at FIG. 11, the pair of strands 850 may not begin until initial routing of a first interior portion 822, a second interior portion 824, a first transitional portion 832, a second transitional portion 834, and a single strand extension portion 836 are routed through the base 100 and initially onto the spool member 300. In particular, as illustrated at FIG. 3, the first exterior portion 812 extends to the first interior portion 822 upon entering the entrance/exit 108 of the base 100. As illustrated, the first interior portion 822, 822p is secured within a first cable holder 110x, 110p. The first cable holder 110x, 110p guides the first interior portion 822, 822p into a tangential position with respect to the wrapping surface 316 of the spool member 300. Likewise, the second exterior portion 814 extends to the second interior portion 824 upon entering a second cable holder 110y, 110p. The second cable holder 110y, 110p similarly guides the second interior portion 824, 824p into a tangential orientation with the wrapping surface 316 of the spool member 300. As the telecommunications cable 800 leaves the first cable holder 110x, 110p, the first transitional portion 832, 832p begins and passes through one of the cable passages 380. In the example depicted at FIG. 5, the first transitional portion 832, 832p passes through the cable passage 380d. Upon reaching the wrapping surface 316 of the spool member 300, the first transitional portion 832, 832p extends to the extension portion 836. The extension portion 836 continues until the first strand 842 and the second strand 844 meet and become the pair of strands 850.

Returning now to FIG. 3, the second interior portion 824, 824p is similarly guided through the second cable holder 110y, 110p. As the telecommunications cable 800 leaves the second cable holder 110y, 110p, the second interior portion 824, 824p extends to the second transitional portion 834. As illustrated at FIG. 5, the second transitional portion 834, like the first transitional portion 832, extends through one of the cable passages 380. In the depicted embodiment, the second transitional portion 834 extends through the cable passage 380b. In the depicted embodiment, as the second transitional portion 834 enters the wrapping area 314, it meets the extension portion 836 and the pair of strands 850 is formed. Upon the pair of strands 850 being formed, the excess portion of the telecommunications cable 800 is wrapped about the spool wrapping area 314 until a short portion of the looped portion 828 remains. For example, FIGS. 10 and 11 illustrate a remaining looped portion 828 that would not have enough length to wrap an additional revolution about the wrapping area 314. Thus, a substantial portion and/or a majority portion of the excess portion of the telecommunications cable 800 is wrapped about the spool wrapping area 314, but the telecommunications cable 800 is in an unsecured configuration 860.

Turning now to FIG. 7, the pair of strands 850 exits the wrapping area 314 and a third transitional portion 852 and a fourth transitional portion 854 is formed as the pair of strands 850 passes through the cable passage 480. A coiled portion 826 has thereby been wound upon the wrapping area 314 between the wall 390 and the wall 490, and the looped portion 828 will now be secured. A third portion 830 of the telecommunications cable 800 may be formed outside of the wrapping area 314 between the third and fourth transitional portions 852, 854 and the looped portion 828. The third portion 830 may be routed through the cable guide arrangement 450, and the looped portion 828 may be positioned around the loop engaging member 440. FIG. 12 illustrates the loop engaging member 440 with the looped portion 828 positioned quite loosely about the loop engaging member 440. To finalize the storage of the telecommunications cable 800 about the spool device 60, the spool wall member 400 is rotated in the wrapping direction Dw (see FIG. 10). The looped portion 828 is thereby brought into contact with a radial surface 458 of the cable guide arrangement 450, and the telecommunications cable 800 is configured in a storage configuration 870. As illustrated at FIG. 13, substantially all slack has been removed from the telecommunications cable 800, and the telecommunications cable 800 is neatly stored within the spool device 60. As the one-way member 200 does not allow the loop engaging member 440 to rotate about the central longitudinal axis A1 opposite the rotational wrapping direction Dw, the one-way member 200 and the loop engaging member 440 secure the telecommunications cable 800 in the storage configuration 870. To further tidy up appearances and to protect the telecommunications cable 800, the cover 500 may be installed over the coiled portion 826 and the looped portion 828 of the telecommunications cable 800.

Turning now to FIGS. 19-24, the entrance and transition of the telecommunications cable 800 when entering from the axial entrance/exit 108a is illustrated. In particular, the first exterior portion 812 approaches the first side 102 of the base plate 101 and enters at the axial entrance/exit 108a. For this example, the first cable holder 110x is assigned to the cable holder 110a. Like the cable holder 110x, 110p, illustrated at FIG. 3 in the prior example, the cable holder 110, 110x, 110a guides the telecommunications cable 800 and, in particular, guides the first interior portion 822, 822a through the base plate 101 of the base 100. The cable holder 110, 110x, 110a guides the first interior portion 822, 822a into the groove 350 of the spool member 300. Upon exiting the cable holder 110, 110x, 110a, the first interior portion 822, 822a extends into a first transitional portion 832, 832a. One or more of the keepers 356 may retain the first transitional portion 832, 832a within the groove 350. Upon the first transitional portion 832, 832a reaching the second end 354 of the groove 350, the first transitional portion 832, 832a may be met by the second strand 844 and thereby immediately form the pair of strands 850. Alternatively, the first transitional portion 832, 832a may extend around the wrapping area 314 as the single strand extension portion 836 until meeting the second strand 844 at one of the cable passages 380. Upon the first strand 842 and the second strand 844 becoming the pair of strands 850, the winding about the wrapping area 314 continues in the same way as the prior example.

In certain embodiments, the first exterior portion 812 and the second exterior portion 814 may both approach the first side 102 of the base plate 101 together and either be routed together through the groove 350 or a groove similar to 350 but customized for holding the first strand 842 and the second strand 844 together. Alternatively, two of the grooves 350 may be included on the spool member 300 and one of the grooves 350 may accommodate the first strand 842 while the other of the grooves 350 may accommodate the second strand 844.

Turning now to FIGS. 14-18, the spool device 90 will be described in detail. The spool device 90 includes similarities to the spool device 60. Therefore, the spool device 90 will be described where it differs from the spool device 60. The spool device 90 includes the base 600 that is similar to the base 100. However, the one-way interface 140 may be eliminated from the base 600. The spool member 700 may substantially include all of the features of the spool member 300. In addition, the spool member 700 may include many of the features of the hub 410 of the spool wall member 400. However, the notches 428 are not needed in a hub 710 of the spool member 700.

The spool device 90 differs from the spool device 60 in that no parts of the spool device 90 rotate relative to each other (except for possibly the cover 500). Therefore, the one-way member 200 and features directly associated with the one-way member 200 are not needed in the spool device 90. Instead of having the loop engaging member 440 that rotates in the wrapping direction Dw, the spool device 90 includes a plurality of loop engaging members 740, and the looped portion 828 is attached to the best fitting one of the loop engaging members 740. The spool member 700 includes an inner annular groove 748 and an outer annular groove 750 that allow the looped portion 828 of the telecommunications cable 800 to extend around the axis A1 almost a full revolution. Therefore, rather than having the single loop engaging member 440 that removes slack from the looped portion 828, the plurality of the loop engaging members 740 is positioned around the central longitudinal axis A1 and thereby substantially allow slack to be removed from the looped portion 828.

Turning now to FIG. 14, the spool member 700 will be described in detail. The spool member 700 extends between a first side 702 and a second side 704. The first side 702 is similar to or the same as the first side 302 of the spool member 300. Thus, the spool member 700 engages the base 600 in substantially the same way as the spool member 300 engages the base 100. The spool member 700 includes a spool wall 760 similar to the spool wall 460. However, the spool wall 760 does not rotate relative to the base 600. The spool wall 760 includes a cable passage 780 similar in function to the cable passage 480. However, as the spool wall 760 does not rotate, neither does the cable passage 780. The spool wall 760 and the cable passage 780 include a first edge 766 similar to the edge 466 and also include a second edge 768 similar to the edge 468. The spool wall 760 includes a perimeter 706 similar to the perimeter 406. However, the perimeter 706 does not rotate with respect to the base 600. The spool member 700 includes an interior 708 similar to the interior 408. In particular, the interior 708 may include some or all of the features of the mount engaging arrangement 420. It is understood that the spool member 700 includes redundant attachments to the base 600. It is further understood that one or more of the redundant attachments may be removed from the spool device 90. For example, a mount engaging arrangement 720, similar to or the same as the mount engaging arrangement 420, may be removed from the spool member 700, and the mount engaging arrangement 320 may instead be used to connect the spool member 700 to the base 600. Alternatively, the mount engaging arrangement 720 may be kept and the features of the mount engaging arrangement 320 of the spool member 700 may be deleted.

Turning again to FIG. 14, the spool wall 760 and features attached thereto will be described in detail. As illustrated, the plurality of the loop engaging members 740 is arranged about the central longitudinal axis A1. Each of the loop engaging members 740 includes a convex portion 742 that may serve as an engagement surface for the looped portion 828 of the telecommunications cable 800. The convex portion 742 meets both the inner annular groove 748 and the outer annular groove 750 in a substantially tangential manner. A lip 752 extends around the outer annular groove 750. Similarly, an external surface 754 of the hub 710 of the spool member 700 forms an inside portion of the inner annular groove 748.

As illustrated at FIG. 15, the loop engaging members 740 each include a surface 758 that may engage the looped portion 828 of the telecommunications cable 800. The first of the loop engaging members 740 includes additional features to introduce the looped portion 828 into the inner annular groove 748 and the outer annular groove 750. Except for the first loop engaging member 740a, the remaining loop engaging members 740 each include the concave portion 744. A groove 746 is thereby formed between the concave portion 744 and the convex portion 742. A last concave portion is formed on an end member 740b. The end member 740b forms one side of the last groove 746. The end member 740b does not include the surface 758 that engages the looped portion 828 on an inside of the looped portion 828.

The telecommunications cable 800 may be selected from a variety of telecommunications cables including fiber-optic cables and/or electrical cables. The telecommunications cables may include a variety of minimum allowable bend radii. In certain embodiments, the device 60, 90 may be adapted for winding, unwinding, storing, and other functions while protecting the telecommunications cable 800 from developing a bend radius of less than 15 millimeters. In other embodiments, the device 60, 90 may be adapted for similarly protecting the telecommunications cable 800 from developing a bend radius of less than 19 millimeters or 25 millimeters or 50 millimeters or 100 millimeters. The example illustrated embodiments of the device 60, 90 are suited for fiber optic cables with an outer diameter of about 1.5 millimeters to 2 millimeters. In other embodiments, other outer diameters of fiber optic cables may be used.

By preventing cable slack at the end of the cable loop 828 from hanging freely and/or uncontrolled in the device 60, 90, the device 60, 90 may prevent uncontrolled bend radius, cable pinching and/or signal losses in telecommunications cable 800 including optical fiber.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

PARTS LIST

| Number | Name |
|---|---|
| A1 | central longitudinal axis |
| A2 | axis |
| A3 | axis |
| Da | distance |
| Ds | depth |
| Dw | rotational wrapping direction |
| Rb | |
| Rl | radius |
| Rw | |
| Ws | |
| 10 | sub-assembly |
| 12 | arrow |
| 20 | sub-assembly |
| 22 | arrow |
| 30 | sub-assembly |
| 32 | arrow |
| 40 | sub-assembly |
| 50 | spool device and cable assembly |
| 60 | spool device |
| 70 | |
| 80 | |
| 90 | spool device |
| 100 | base |
| 101 | base plate |
| 102 | first side |
| 104 | second side |
| 106 | perimeter |
| 108 | entrance/exit |
| 108a | axial entrance/exit |
| 108n | normal perimeter entrance/exit |
| 108r | reversing tangent perimeter entrance/exit |
| 108t | tangent perimeter entrance/exit |
| 110 | cable holder |
| 110a | cable holder |
| 110p | cable holder |
| 110x | first cable holder |
| 110y | second cable holder |
| 112 | first end |
| 114 | interior end |
| 116 | keeper |
| 118 | radial slot |
| 120 | fastener stand |
| 122 | fastener hole |
| 124 | recess |
| 130 | first mount |
| 132 | partially cylindrical members |
| 134 | opposing latches |
| 136 | recess |
| 140 | one-way interface |
| 142 | one-way elements |
| 150 | second mount |
| 152 | latch |
| 154 | alignment keys |
| 156 | annular recess |
| 158 | recess |
| 160 | mounting element |
| 162 | mounting slot pair |
| 164 | mounting slot |
| 166 | mounting slot |
| 170 | base layer |
| 180 | cable routing layer |
| 200 | one-way member |
| 202 | first end |
| 204 | second end |
| 206 | outer surface |
| 208 | inner surface |
| 210 | flange |
| 220 | one-way element |
| 222 | pawl |
| 224 | cantilevered arm |
| 230 | engagement member |
| 232 | base end |
| 234 | extended end |
| 236 | opposing sides |
| 300 | spool member |
| 302 | first end |
| 304 | second side |
| 306 | perimeter |
| 308 | interior |
| 310 | hub |
| 312 | exterior |
| 314 | cable wrapping area |
| 316 | wrapping surface |
| 318 | lip |
| 320 | mount engaging arrangement |
| 322 | catch |
| 324 | latch relief |
| 326 | latch relief edge |
| 328 | notch |
| 330 | notch edges |
| 332 | notch bottom |
| 340 | ramp |
| 342 | tangent end |
| 344 | raised end |
| 346 | longitudinal end |
| 348 | pocket |
| 349 | slot |
| 350 | groove |
| 352 | first end |
| 354 | second end |
| 356 | keepers |
| 360 | partition member |
| 360a | partition member |
| 360b | partition member |
| 360c | partition member |
| 360d | partition member |
| 362 | edge |
| 364 | edge |
| 366 | edge |
| 368 | edge |
| 370 | radius |
| 380 | cable passage |
| 380a | cable passage |
| 380b | cable passage |
| 380c | cable passage |
| 380d | cable passage |
| 390 | wall |
| 392 | first side |
| 394 | second side |
| 396 | stationary wall layer |
| 398 | cable wrapping layer |
| 400 | spool wall member |
| 402 | first side |
| 404 | second side |
| 406 | perimeter |
| 408 | interior |
| 410 | hub |
| 412 | interior |

-continued

PARTS LIST

| Number | Name |
|---|---|
| 414 | annular groove |
| 420 | mount engaging arrangement |
| 422 | catch |
| 424 | latch relief |
| 428 | notch |
| 430 | notch edges |
| 432 | notch bottom |
| 440 | loop engaging member |
| 442 | cylindrical surface |
| 444 | retainers |
| 450 | cable guide arrangement |
| 452 | guides |
| 452a | guide |
| 452b | guide |
| 454 | pair of keepers |
| 454a | first keeper |
| 454b | second keeper |
| 456 | radial keeper |
| 458 | radial surface |
| 460 | spool wall |
| 462 | first end |
| 464 | second end |
| 466 | edge |
| 468 | edge |
| 470 | chamfer |
| 472 | bottom |
| 480 | cable passage |
| 490 | wall |
| 492 | first side |
| 494 | second side |
| 496 | outer wall layer |
| 498 | cable loop layer |
| 500 | cover |
| 502 | first side |
| 504 | second side |
| 506 | end wall |
| 508 | perimeter wall |
| 510 | attachment arrangement |
| 512 | fastener hole |
| 600 | base |
| 700 | spool member |
| 702 | first side |
| 704 | second side |
| 706 | perimeter |
| 708 | interior |
| 710 | hub |
| 714 | wrapping area |
| 720 | mount engaging arrangement |
| 740 | loop engaging member |
| 740a | first loop engaging member |
| 740b | end member |
| 742 | convex portion |
| 744 | concave portion |
| 746 | groove |
| 748 | inner annular groove |
| 750 | outer annular groove |
| 752 | lip |
| 754 | external surface |
| 758 | surface |
| 760 | spool wall |
| 766 | first edge |
| 768 | second edge |
| 780 | cable passage |
| 800 | telecommunications cable |
| 802 | first end |
| 804 | second end |
| 812 | first exterior portion |
| 814 | second exterior portion |
| 822 | first interior portion |
| 822a | first interior portion |
| 822p | first interior portion |
| 824 | second interior portion |
| 824p | second interior portion |
| 826 | coiled portion |
| 828 | looped portion |

-continued

PARTS LIST

| Number | Name |
|---|---|
| 830 | third portion |
| 832 | first transitional portion |
| 832a | first transitional portion |
| 832p | first transitional portion |
| 834 | second transitional portion |
| 836 | single strand extension portion |
| 842 | first strand |
| 844 | second strand |
| 850 | pair of strands |
| 852 | third transitional portion |
| 854 | fourth transitional portion |
| 860 | unsecured configuration |
| 870 | storage configuration |
| 902 | first device |
| 904 | second device |
| 912 | first connecting element |
| 914 | second connecting element |

What is claimed is:

1. A spool device configured for storing at least a portion of a telecommunications cable in a storage configuration, the spool device comprising:
a base including at least a first cable holder configured for receiving a first portion of the telecommunications cable and a second cable holder configured for receiving a second portion of the telecommunications cable;
a spool member mounted to the base, the spool member including a wrapping area configured for storing a coiled portion of the telecommunications cable;
at least one loop engaging member configured for engaging a looped portion of the telecommunications cable and securing at least the coiled portion and the looped portion of the telecommunications cable in the storage configuration; and
a spool wall positioned between the wrapping area and the at least one loop engaging member.

2. The spool device of claim 1, wherein the first cable holder, the second cable holder, the wrapping area, and the at least one loop engaging member are all configured to route the telecommunications cable with bend radii greater than a predetermined minimum bend radius.

3. The spool device of claim 2, wherein the predetermined minimum bend radius is 15 mm.

4. The spool device of claim 1 wherein the wrapping area defines a first axis and the at least one loop engaging member defines a second axis substantially parallel to and spaced from the first axis.

5. The spool device of claim 1, wherein the base defines a perimeter, wherein the first cable holder and the second cable holder each respectively extend from an entrance/exit at the perimeter to an interior end, wherein the first cable holder and the second cable holder are each respectively oriented at the entrance/exits with a predetermined orientation with respect to the perimeter, and wherein the first cable holder and the second cable holder are each respectively oriented at the interior end to be substantially tangential to the wrapping area in a same rotational direction.

6. The spool device of claim 1, further comprising a wall including at least one cable passage, the wall positioned between the wrapping area and at least portions of the first cable holder and the second cable holder, the at least one cable passage configured to transfer a first transitional portion of the telecommunications cable from the first portion of the telecommunications cable to a first strand of a pair of strands of the coiled portion of the telecommunications cable, and the at least one cable passage further configured to transfer a second transitional portion of the telecommunications cable from the second portion of the telecommunications cable to a second strand of the pair of strands of the coiled portion of the telecommunications cable.

7. The spool device of claim 6, wherein the wall is one piece with the spool member.

8. The spool device of claim 6, wherein the at least one cable passage includes at least two of the cable passages and separate ones of the at least two cable passages are configured to transfer the first transitional portion and the second transitional portion, respectively.

9. The spool device of claim 1, wherein the base includes a releasable mount and the spool member includes a mount engaging arrangement, wherein the mount engaging arrangement releasably attaches to the releasable mount and thereby mounts the spool member to the base, and wherein the mount engaging arrangement detaches from the releasable mount and thereby unmounts the spool member from the base.

10. The spool device of claim 9, wherein the spool member is rotationally fixed to the base when the mount engaging arrangement of the spool member is releasably attached to the releasable mount of the base.

11. The spool device of claim 1, wherein the spool wall includes at least one cable passage.

12. The spool device of claim 11, further comprising a one-way device, wherein the spool wall and the at least one loop engaging member are included on a spool wall member that is rotatably mounted to the base, and wherein the one-way device allows the spool wall member to rotate in a wrapping direction and substantially prevents the spool wall member from rotating opposite the wrapping direction.

13. The spool device of claim 11, wherein the spool wall and the at least one loop engaging member are included on the spool member.

14. A method of storing at least the portion of the telecommunications cable on the spool device of claim 1, the method including:
providing the spool device;
providing the telecommunications cable;
looping the telecommunications cable and thereby forming the looped portion of the telecommunications cable;
routing the first portion of the telecommunications cable on the first cable holder of the base;
routing the second portion of the telecommunications cable on the second cable holder of the base;
wrapping the telecommunications cable on the wrapping area of the spool member and thereby forming the coiled portion of the telecommunications cable; and
securing the looped portion of the telecommunications cable on the at least one loop engaging member and thereby securing at least the coiled portion and the looped portion of the telecommunications cable in the storage configuration.

15. The method of claim 14, further comprising:
connecting a first end of the telecommunications cable to a first mounted device prior to wrapping the telecommunications cable on the wrapping area of the spool member; and
connecting a second end of the telecommunications cable to a second mounted device prior to wrapping the telecommunications cable on the wrapping area of the spool member.

16. The spool device of claim 1, further comprising the telecommunications cable, wherein the telecommunications cable is a patch cable, wherein a first end of the telecommunications cable includes a first connector, and wherein a second end of the telecommunications cable includes a second connector.

17. A spool device configured for storing at least a portion of a telecommunications cable in a storage configuration, the spool device comprising:
a base layer included on a base;
a cable routing layer included on the base, the cable routing layer including a first cable holder and a second cable holder;
a stationary wall layer included on a spool member mounted to the base, the stationary wall layer including a wall fixedly mounted to the base;
a cable wrapping layer adjacent the stationary wall layer, the cable wrapping layer including a wrapping area;
an outer wall layer adjacent the cable wrapping layer, the outer wall layer including a spool wall; and
a cable loop layer adjacent the outer wall layer opposite the cable wrapping layer, the cable loop layer including at least one loop engaging member on a side of the spool wall opposite the wrapping area.

18. The spool device of claim 17, further comprising:
at least one cable passage through the wall of the stationary wall layer; and
at least one cable passage through the spool wall of the outer wall layer.

19. The spool device of claim 17, further comprising a spool wall member that is rotatably mounted to the base, the spool wall member including the spool wall positioned at the outer wall layer, and the spool wall member further including the at least one loop engaging member positioned at the cable loop layer.

20. The spool device of claim 17, wherein the spool wall and the at least one loop engaging member are included on the spool member.

* * * * *

UNITED STATES PATENT AND TRADEMARK OFFICE
CERTIFICATE OF CORRECTION

PATENT NO. : 11,225,393 B2  
APPLICATION NO. : 15/998421  
DATED : January 18, 2022  
INVENTOR(S) : Roger Alaerts et al.

Page 1 of 1

It is certified that error appears in the above-identified patent and that said Letters Patent is hereby corrected as shown below:

In the Specification

Column 1, Line 10: "which is are incorporated" should read --which are incorporated--

Signed and Sealed this  
Twenty-first Day of June, 2022

Katherine Kelly Vidal  
*Director of the United States Patent and Trademark Office*